United States Patent
Ito et al.

(10) Patent No.: US 10,031,381 B2
(45) Date of Patent: Jul. 24, 2018

(54) LIQUID CRYSTAL DISPLAY DEVICE

(71) Applicant: NLT Technologies, Ltd., Kanagawa (JP)

(72) Inventors: Hideki Ito, Kanagawa (JP); Shinichi Nishida, Kanagawa (JP); Takahiko Watanabe, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 14/625,166

(22) Filed: Feb. 18, 2015

(65) Prior Publication Data
US 2015/0234245 A1    Aug. 20, 2015

(30) Foreign Application Priority Data
Feb. 19, 2014 (JP) .................. 2014-029068

(51) Int. Cl.
*G02F 1/1343* (2006.01)
*G02F 1/1337* (2006.01)

(52) U.S. Cl.
CPC .... *G02F 1/134363* (2013.01); *G02F 1/13439* (2013.01); *G02F 1/133707* (2013.01); *G02F 1/134309* (2013.01); *G02F 2001/134318* (2013.01)

(58) Field of Classification Search
CPC .......... G02F 1/134363; G02F 1/13439; G02F 1/134309; G02F 1/133707; G02F 2001/134318; G02F 2201/12; G02F 2201/121; G02F 2201/123; G02F 2201/128

USPC .......................................... 349/139, 141, 143
See application file for complete search history.

(56) References Cited

U.S. PATENT DOCUMENTS

| 6,266,116 | B1 | 7/2001 | Ohta et al. | |
| 7,471,367 | B2* | 12/2008 | Son | G02F 1/134363 349/139 |
| 7,557,899 | B2* | 7/2009 | Kitagawa | G02F 1/134363 349/138 |
| 8,421,976 | B2* | 4/2013 | Hirosawa | G02F 1/134363 349/141 |

FOREIGN PATENT DOCUMENTS

| JP | 09-105908 | 4/1997 |
| JP | 2004-271971 | 9/2004 |

* cited by examiner

*Primary Examiner* — Angela Davison
(74) *Attorney, Agent, or Firm* — Young & Thompson

(57) ABSTRACT

A lateral-electric-field mode liquid crystal display device includes: substrates; a liquid crystal layer; plural scanning lines and plural data lines crossing on one of the substrates; plural pixels formed by the scanning lines and the data lines; at least one strip-shaped pixel electrode arranged in each pixel and extending along the data line or the scanning line; a common electrode located in a layer closer to the liquid crystal layer than the strip-shaped pixel electrodes so as to cover the scanning lines and the data lines; and a first rectangular pixel electrode connected with one end of each of the at least one strip-shaped pixel electrode to from a T shape. The first rectangular pixel electrode overlaps with corner parts of an opening section of the common electrode, where the corners are closer to the first rectangular pixel electrode than the other corners of the opening section.

12 Claims, 23 Drawing Sheets

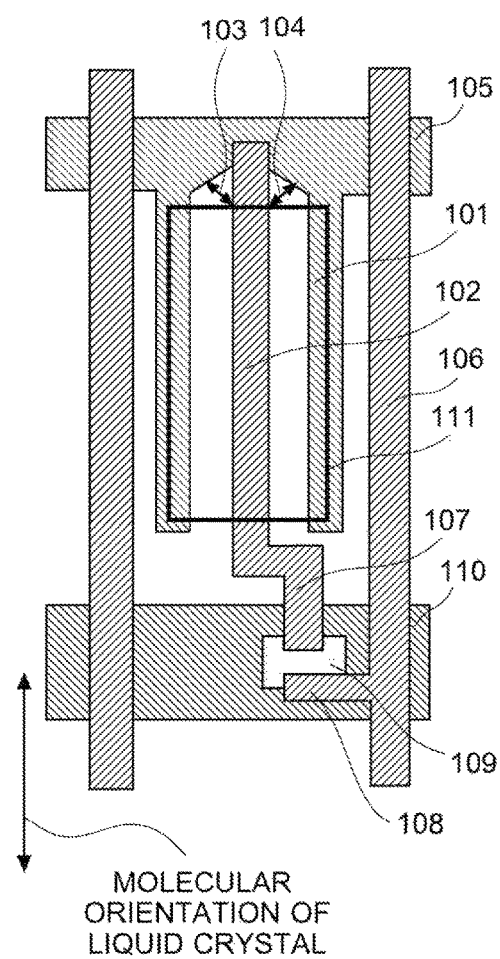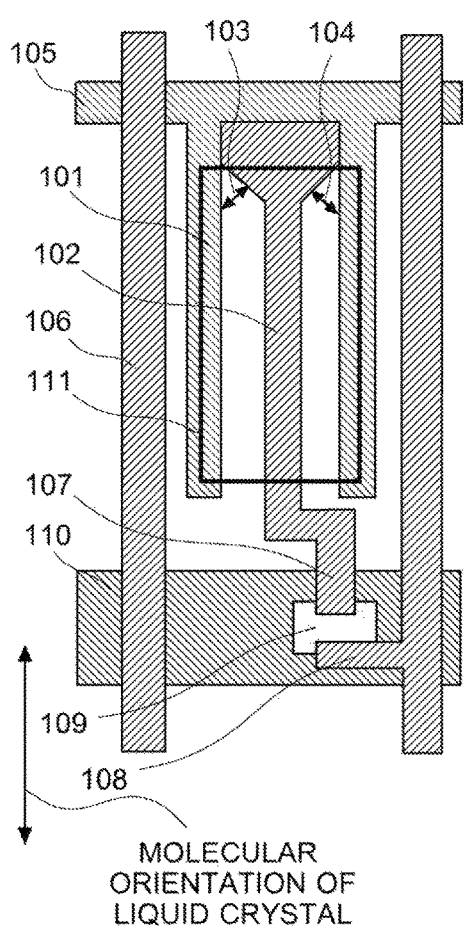
FIG. 21A
RELATED ART
FIG. 21B
RELATED ART

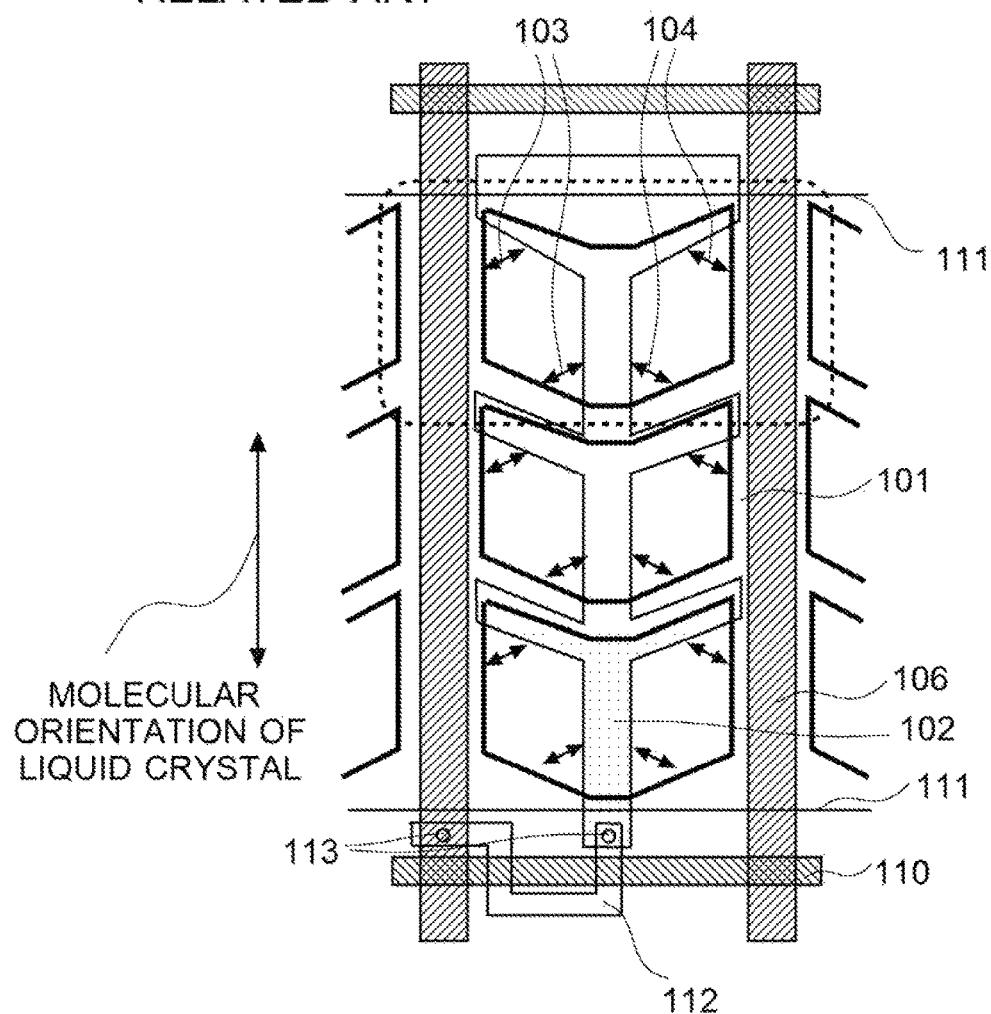

LIQUID CRYSTAL DISPLAY DEVICE

TECHNICAL FIELD

The present invention relates to a liquid crystal display device. In particular, the present invention relates to a lateral-electric-field mode active matrix liquid crystal display device having a large aperture and being capable of realizing high resolution.

BACKGROUND

In recent years, there are provided lateral-electric-field mode liquid crystal display devices, which is represented by an IPS (In-plane Switching) liquid crystal display devices, on the market. Such liquid crystal display devices have excellent viewing angle and are widely used in many information terminals ranging from comparatively large-sized devices, such as a television set and a monitor, to portable devices such as a tablet and a smart phone. An IPS liquid crystal display device includes two kinds of strip-shaped (oblong-shaped) electrodes (strip-shaped pixel electrodes and strip-shaped portions of a common electrode) both arranged in parallel at intervals, when viewed from a position perpendicularly above the substrates, and drives liquid crystal molecules by using an electric field applied between each set of the strip-shaped pixel electrode and the strip-shaped portion of the common electrode. Such IPS liquid crystal display devices are characterized by a feature that there is no major change in the view even when the direction viewed from the observer has changed. This is because the observer does not perceive a great change of the orientation of liquid crystal molecules in such display devices even after the viewing angle has been changed.

Accordingly, IPS liquid crystal display devices are characterized by a great viewing angle. In addition, some of IPS liquid crystal display devices may employ a multi-domain structure as follows, in order to enhance their viewing angle characteristics. That is, such IPS liquid crystal display devices may employ a structure where an electrode in each pixel is bent by arranging a part and the other part of the two kinds of strip-shaped electrodes in the following manners and joining the both parts together. That is, a part of the two kinds of strip-shaped electrodes is arranged so as to produce an electric field which is to be applied to the liquid crystal and forms +θ° angle between the direction of the electric field and the initial orientation of liquid crystal molecules. The other part of the two kinds of strip-shaped electrodes is arranged so as to produce the electric field which is to be applied to the liquid crystal and forms −θ° angle between the direction of the electric field and the initial orientation of liquid crystal molecules. It should be noted that the strip-shaped electrodes (strip-shaped pixel electrodes and strip-shaped portions of the common electrodes) do not need to have independent bodies. As far as edge portions of a pair of the opposing electrodes are in parallel, the end portion of each electrode may have any shape other than a strip shape, such that the end portions may be connected together, or a portion except the portion where the pair of electrodes are in the opposing positions may have a different shape.

However, in this multi-domain structure, each pixel includes a bent part at the junction of the electrode portion for the +θ° angle and another electrode portion for the −θ° angle. The bent part forms a domain boundary between a liquid crystal domain where there is a clockwise deformation and the liquid crystal domain where there is a counter-clockwise deformation, which causes disclination of the liquid crystal molecules and results in a reduction of the transmittance.

A liquid crystal display device includes a plurality of scanning lines and a plurality of data lines both arranged on one of a pair of substrates, and a plurality of pixels. Each of the pixels is formed by a divided area whose boundary is defined by each two scanning lines and each two data lines out of the scanning lines and the data lines. The smaller the size of each pixel is, the larger the ratio of the area of scanning lines and data lines in each pixel, and as a result, the aperture ratio decreases. FIG. 20 is a graph showing a relationship between an aperture ratio and a pixel size wherein each of the scanning line width and the data line width is set at a constant value of 10 μm and a region of a pixel except the wiring area is assumed as an aperture. As can be understood from this relationship, the aperture ratio decreases prominently especially when the pixel size decreases to 100 μm or less. Accordingly, in liquid crystal display devices employing the multi-domain structure described above, there arises a problem that a decrease in the relative transmittance due to the bent part of an electrode in each pixel becomes too significant to be disregarded.

In order to avoid this problem, it is advantageous for the liquid crystal display devices to adopt a structure of a single domain where an electrode in each pixel is not bent. However, a use of the single domain structure results in loss of the outstanding viewing angle characteristics obtained with a multi-domain structure. To solve this problem, structures in which liquid crystal molecules rotate in two directions within each pixel without using a bent electrode, are described in Japanese Unexamined Patent Application Publications (JP-A) No. H09-105908 (FIGS. 32 and 36) and JP-A No. 2004-271971 (FIGS. 45, 46 and 48).

As a representative example of the conventional techniques, FIGS. 21 A and 21 B illustrate pixel structures disclosed in JP-A No. JP H09-105908 (in FIGS. 32 and 36), respectively, where upper and lower sides of the each figure are reversed in comparison with the original figures in order to simplify the following description. Each of FIGS. 21 A and 21 B shows common electrode 101, pixel electrode 102, electric fields 103 and 104, common electrode line 105, data line 106, source electrode 107, drain electrode 108, amorphous silicon (TFT channel region) 109, scanning line (gate line) 110, and boundary 111 of a black matrix. In the above structures, each or one of the common electrode 101 and the pixel electrode 102 additionally has an edge portion with an inclining edge such that one electrode gradually approaches to the other electrode as getting closer to the pixel end. In the approached region, the electrodes produce electric fields 103, 104 in two different directions. The document describes that such a structure makes two directions of rotation of liquid crystal molecules within a pixel, which can realize a multi-domain structure without using a bent electrode in each pixel. However, since each or one of the common electrode 101 and the pixel electrode 102 additionally has the edge portion with an inclining edge, the opening decreases in comparison with an area which could be used as the opening in the original structure, and it causes a decrease of the transmittance.

JP-A No. 2004-271971 also discloses in FIGS. 44 and 47 the above-described pixel structure that liquid crystal molecules rotates in two different directions within each pixel without using bent electrodes. As a representative example of the conventional techniques, FIG. 22 shows a pixel structure disclosed in JP-A No. 2004-271971 (in FIG. 44), where some components that are not used in the following description, such as accumulated capacitance lines and others, are omitted. FIG. 20 shows common electrode 101, pixel electrode 102, electric fields 103 and 104, data line 106, scanning line (gate line) 110, semiconductor layer 112, and through holes 113. Also in the disclosed structure, one electrode gradually approaches the other electrode, and the approaching region produces the electric fields 103 and 104 in two different directions. The document describes that such a structure makes two directions of rotation of liquid crystal molecules within a pixel, which can realize a multi-domain structure without using a bent electrode in each pixel. However, this structure also causes a decrease of the transmittance for the same reason as the reason described above.

Furthermore, these structures can cause the decrease of the transmittance for another reason, and the reason will be described with reference to FIGS. 23 and 24. FIG. 23 is an enlarged view of a region surrounded with broken lines in FIG. 22. In this structure, the common electrode 101 and the pixel electrode 102 are formed in different layers and there are some regions where the common electrode 101 and the pixel electrode 102 partly overlaps with each other within a pixel. In the overlapping regions and in specific neighboring regions, electric fields 114 and 115 in unwanted directions, which are different from those of the intended electric fields 103 and 104, are produced. These electric fields 114 and 115 are referred to as so-called fringe electric fields. Such a structure causes a rotation of liquid crystal molecules, which exist in an area affected by the electric fields 114 and 115, in a direction opposite to the intended direction, which produces a reverse rotation domain 117. On the boundary of the reverse rotation domain 117 and the forward rotation domain 118, there are produced disclination 116, causing a decrease of the transmittance.

FIG. 24 illustrates situations of the disclination 116, the reverse rotation domain 117 and the forward rotation domain 118. Under the situation that a reverse rotation domain exists in proximity to the forward rotation domain, an external force, such as finger pressing, which has been temporarily applied onto the display screen during the drive of the display screen, makes a disturbance of the orientation of the liquid crystal molecules during the application of the force. When the screen is released from the external force, the liquid crystal molecules try to return to the original orientation again. However, it more likely causes a phenomena that the forward rotation domain is reduced as compared to a state before the external force is applied, and reversely, the reverse rotation domain becomes larger by an amount corresponding to the reduction and stabilizes in such a state. It causes a difference of the display condition between a display state before an external force is applied and a display state after an external force of finger pressing. As a result, there occurs a display issue recognized as finger pressing marks. This phenomenon causes a remarkable deterioration of the liquid crystal display device in the image quality.

The present invention seeks to solve the problems.

SUMMARY

In view of the above-described problems, there are provided illustrative IPS liquid crystal display devices which have a large aperture and exhibit an excellent viewing angle in spite of their small pixel sizes, and can avoid appearance of finger pressing marks thereon.

A lateral-electric-field mode liquid crystal display device according to a first aspect of the present invention comprises: a pair of substrates; a liquid crystal layer put between the substrates; a plurality of scanning lines and a plurality of data lines, both extending in straight lines and crossing each other on one of the substrates; and a plurality of pixels formed by the scanning lines and the data lines and arrayed in matrix. The liquid crystal display device further comprises at least one strip-shaped pixel electrode arranged in each of the pixels and extending along one of the data lines or one of the scanning lines; and a common electrode having a grid form, located in a layer closer to the liquid crystal layer than the strip-shaped pixel electrodes so as to cover the scanning lines and the data lines, and including an opening section located in each of the pixels. Each of the at least one strip-shaped pixel electrode and a part of the common electrode extending in parallel with an extending direction of the at least one strip-shaped pixel electrode forms therebetween an electric field to be applied to the liquid crystal layer, where the electric field is in substantially parallel with a surface direction of the substrates. The liquid crystal display device further comprises a first rectangular pixel electrode arranged in each of the pixels, being greater in width than the at least one strip-shaped pixel electrode, and connected with one end of each of the at least one strip-shaped pixel electrode to from a T shape. The first rectangular pixel electrode overlaps with corner parts of the opening section of the common electrode, where the corner parts concerned are closer to the first rectangular pixel electrode than the other corner parts of the opening section.

When a plurality of the strip-shaped pixel electrodes are arranged in each of the pixels in the first aspect of the present invention, the first rectangular pixel electrodes connected with the respective strip-shaped pixel electrodes may be connected together, and a strip-shaped common electrode may be further arranged between the neighboring strip-shaped pixel electrodes in each of the pixels, where both ends of the strip-shaped common electrode are connected with the common electrode having the grid form.

A lateral-electric-field mode liquid crystal display device according to a second aspect of the present invention, comprises a pair of substrates; a liquid crystal layer put between the substrates; a plurality of scanning lines and a plurality of data lines, both extending in straight lines and crossing each other on one of the substrates; and a plurality of pixels formed by the scanning lines and the data lines and arrayed in matrix. The liquid crystal display device further comprises at least one strip-shaped pixel electrode arranged in each of the pixels and extending along one of the data lines or one of the scanning lines; and a common electrode having a grid form, located in a layer closer to the liquid crystal layer than the strip-shaped pixel electrodes so as to cover the scanning lines and the data lines, and including an opening section located in each of the pixels. Each of the at least one strip-shaped pixel electrode and a part of the common electrode extending in parallel with an extending direction of the at least one strip-shaped pixel electrode forms therebetween an electric field to be applied to the liquid crystal layer, where the electric field is in substantially parallel with a surface direction of the substrates. The liquid crystal display device further comprises a projecting-shaped pixel electrode arranged in each of the pixels and including at least one projecting part and a main part being greater in width than the at least one strip-shaped pixel electrode, where the projecting-shaped pixel electrode is connected with one end of each of the at least one strip-shaped pixel electrode at a position outside the opening section. The at least one projecting part overlaps with at least one corner part of the opening section of the common electrode, where the at least one corner part is closer to the projecting-shaped pixel electrode than the other corner parts of the opening section.

When a plurality of the strip-shaped pixel electrodes are arranged in each of the pixels in the second aspect of the present invention, the projecting-shaped pixel electrodes connected with the respective strip-shaped pixel electrodes may be connected together, and a strip-shaped common electrode may be further arranged between the neighboring strip-shaped pixel electrodes in each of the pixels, where both ends of the strip-shaped common electrode are connected with the common electrode having the grid form.

In the first and second aspects of the present invention, the common electrode may include protruding parts each protruding from the common electrode inside the opening section in each of the pixels. Further, the liquid crystal display device may further comprise a second rectangular pixel electrode arranged in each of the pixels, being greater in width than the at least one strip-shaped pixel electrode, and connected with the other end of each of the at least one strip-shaped pixel electrode to from a T shape, where the second rectangular pixel electrode overlaps with one of the protruding parts of the common electrode in each of the pixels.

Here, a region surrounded by the strip-shaped pixel electrode, the first rectangular pixel electrode or the projecting-shaped pixel electrode, and the second rectangular pixel electrode, and the common electrode is referred to as a "column". There are a plurality of columns within each pixel. Liquid crystal molecules undergo twist deformation inside the column mostly. At this time, each of the plurality of columns corresponds to either one of the two areas of different twist deformation orientations. That is, by using a pixel structure as described above, it is possible to obtain a lateral-electric-field mode liquid crystal display device having outstanding viewing angle characteristics and a large aperture and that avoids appearance of finger pressing marks thereon. This is because there are columns with different twist deformation orientations of liquid crystal in each pixel.

In the first aspect or the second aspect of the present invention, by locating the common electrode closer to the liquid crystal layer, an insulating layer between the pixel electrodes and the common electrode can be used in common with an interlayer insulating film between the common electrode and the data lines. As a result, the liquid crystal display device can be made at a lower cost since the number of times of formation of the insulating layer can be decreased.

A lateral-electric-field mode liquid crystal display device according to a third aspect of the present invention comprises: a pair of substrates; a liquid crystal layer put between the substrates; a plurality of scanning lines and a plurality of data lines, both extending in straight lines and crossing each other on one of the substrates; and a plurality of pixels formed by the scanning lines and the data lines and arrayed in matrix. The liquid crystal display device further comprises a common electrode having a grid form, covering the scanning lines and the data lines, and including an opening section located in each of the pixels; and a strip-shaped pixel electrode arranged in each of the pixels, located in a layer closer to the liquid crystal layer than the common electrode and extending along one of the data lines or one of the scanning lines. The strip-shaped pixel electrode and a part of the common electrode extending in parallel with an extending direction of the strip-shaped pixel electrode forms therebetween an electric field to be applied to the liquid crystal layer, where the electric field is in substantially parallel with a surface direction of the substrates. The liquid crystal display device further comprises a rectangular pixel electrode arranged in each of the pixels, being greater in width than the strip-shaped pixel electrode, and connected with one end of the strip-shaped pixel electrode to from a T shape. The rectangular pixel electrode overlaps with the common electrode while not extending inside the opening section.

In the third aspect of the present invention, by locating the pixel electrodes closer to the liquid crystal layer, an insulating layer may be located between the pixel electrodes and the data lines, which can avoid a short circuit between the pixel electrodes and the data lines coming from pattern collapsing of the pixel electrodes or the data lines.

In the first to third aspects of the present invention, an initial orientation of liquid crystal molecules in the liquid crystal layer can be substantially identical with an extending direction of the strip-shaped pixel electrodes.

Under the condition, it is necessary to use liquid crystal molecules having positive dielectric anisotropy (hereafter referred to as "positive liquid crystal", and similarly, liquid crystal molecules having negative dielectric anisotropy are referred to as "negative liquid crystal"). A low voltage drive and a high speed response can be attained since positive liquid crystal generally has large dielectric anisotropy and low viscosity as compared to negative liquid crystal.

Alternatively, in the first to third aspects of the present invention, an initial orientation of liquid crystal molecules in the liquid crystal layer can be substantially identical with a direction perpendicular to an extending direction of the strip-shaped pixel electrodes.

Under the condition, it is necessary to use negative liquid crystal. Homogeneously aligned negative liquid crystal causes almost no deformations in an electric field having a component in a direction perpendicular to the substrate surface. Therefore, the homogenous alignment causes twist deformation with respect to an electric field having a component in a direction parallel to the substrate side without causing deformations in an electric field having a component in a direction perpendicular to the substrate surface. Thus, it is possible to obtain outstanding display properties about viewing angle.

In the first to third aspects of the present invention, both the pixel electrodes and the common electrode may be transparent.

By using a transparent electrically-conductive film for the electrodes, light can pass through a part of the electrodes, which realizes an increase of the transmittance.

Accordingly, there are provided, as embodiments of the present invention, illustrative IPS liquid crystal display devices which have a large aperture and exhibit an excellent viewing angle characteristics in spite of their small pixel size, and can avoid appearance of finger pressing marks thereon.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 21A and FIG. 21B are plan views illustrating pixel structures disclosed in JP-A No. H09-105908 (FIGS. 32 and 36), respectively, as representative examples of conventional techniques;

FIG. 22 is a plan view illustrating a pixel structure disclosed in JP-A No. 2004-271971 (FIG. 44) as a representative example of conventional techniques;

DETAILED DESCRIPTION

Figure 1:
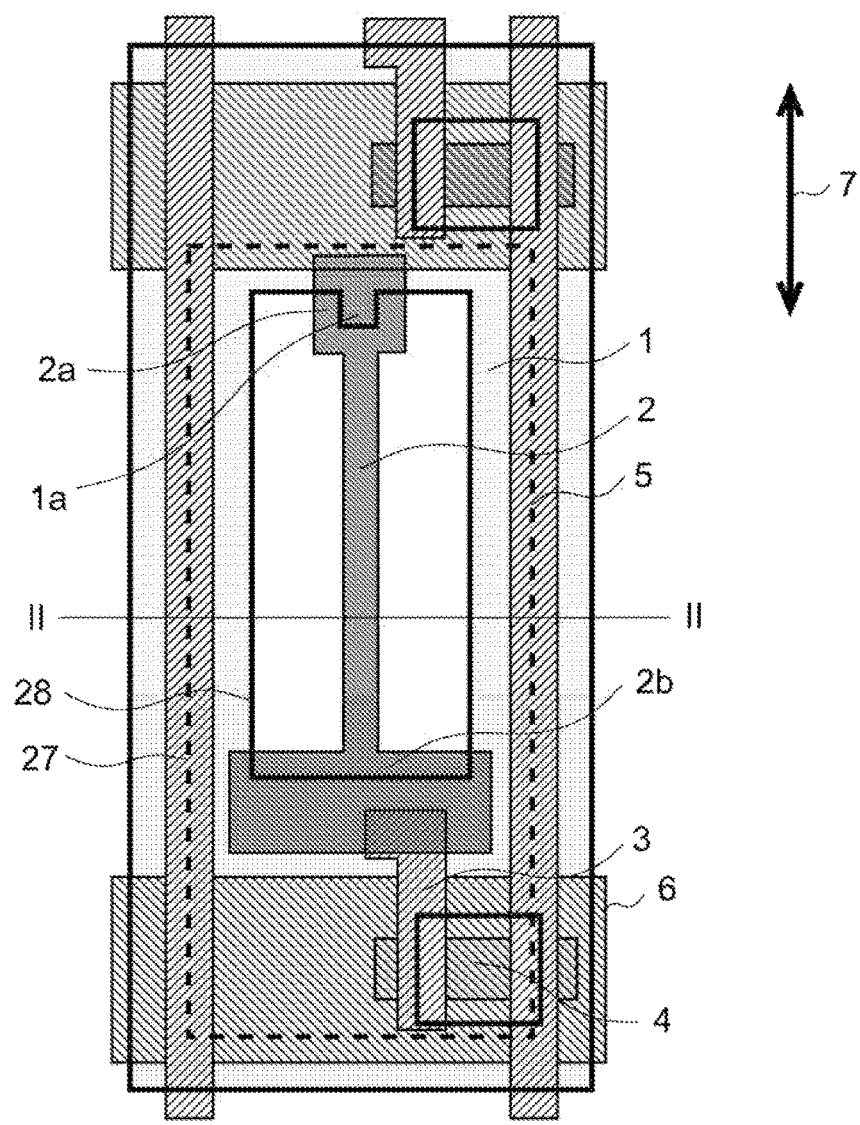
FIG. 1 is a plan view illustrating a structure of one pixel of a liquid crystal display device according to EXAMPLE 1.

Illustrative embodiments of liquid crystal display devices will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

As described in the descriptions of the background, in an IPS liquid crystal display device, the aperture ratio becomes smaller with a reduction of a pixel size. In order to solve the problem, a pixel structure that rotates liquid crystal molecules in two directions within a pixel by using non-bent electrodes has been proposed. However, the conventional structure still has display issues of a decrease of transmittance due to a region that is occupied by the electrodes but was available as a part of an opening before the above-described countermeasure, or display issues of a decrease of transmittance and finger pressing marks due to the liquid crystal molecules rotating in a direction opposite to the intended direction.

In view of that, an illustrative liquid crystal display device as one embodiment of the present invention includes a strip-shaped pixel electrode arranged in each pixel and extending along one of the data lines or one of the scanning lines; and a common electrode having a grid form, located in a layer closer to the liquid crystal layer than the strip-shaped pixel electrodes so as to cover at least the scanning lines and the data lines. If the plurality of the strip-shaped pixel electrodes are arranged in each pixel, a strip-shaped common electrode may be further arranged between the neighboring strip-shaped pixel electrodes in each pixel, where both ends of the strip-shaped common electrode is connected with the common electrode having the grid form. In each pixel, a first rectangular pixel electrode or a projecting-shaped pixel electrode is arranged. In the case of the first rectangular pixel electrode, the first rectangular pixel electrode is greater in width than the strip-shaped pixel electrode, and is connected with one end of the strip-shaped pixel electrode to from a T shape. The first rectangular pixel electrode overlaps with corner parts of the opening section formed in the common electrode, where the corner parts concerned are closer to the first rectangular pixel electrode than the other corner parts of the opening section. In the case of the projecting-shaped pixel electrode, the main part of the projecting-shaped pixel electrode is greater in width than the strip-shaped pixel electrode, and the projecting-shaped pixel electrode is connected with one end of the strip-shaped pixel electrode at a position outside the opening section. One or both projecting parts of the projecting-shaped pixel electrode overlap with at one or both corner parts of the opening section of the common electrode, respectively, where the at least one corner part is closer to the projecting-shaped pixel electrode than the other corner parts of the opening section.

As another embodiment, an illustrative liquid crystal display device includes a common electrode having a grid form and covering at least the scanning lines and the data lines. In each pixel, a strip-shaped pixel electrode is arranged in a layer closer to the liquid crystal layer than the common electrode and extends along one of the data lines or one of the scanning lines. If the plurality of the strip-shaped pixel electrodes are arranged in each pixel, a strip-shaped common electrode may be further arranged between the neighboring strip-shaped pixel electrodes in each pixel, where both ends of the strip-shaped common electrode is connected with the common electrode having the grid form. In each pixel, a rectangular pixel electrode is arranged, where the rectangular pixel electrode is greater in width than the strip-shaped pixel electrode, and connected with one end of the strip-shaped pixel electrode to from a T shape. The rectangular pixel electrode overlaps with the common electrode while not extending inside the opening section.

EXAMPLE 1

Figure 2:
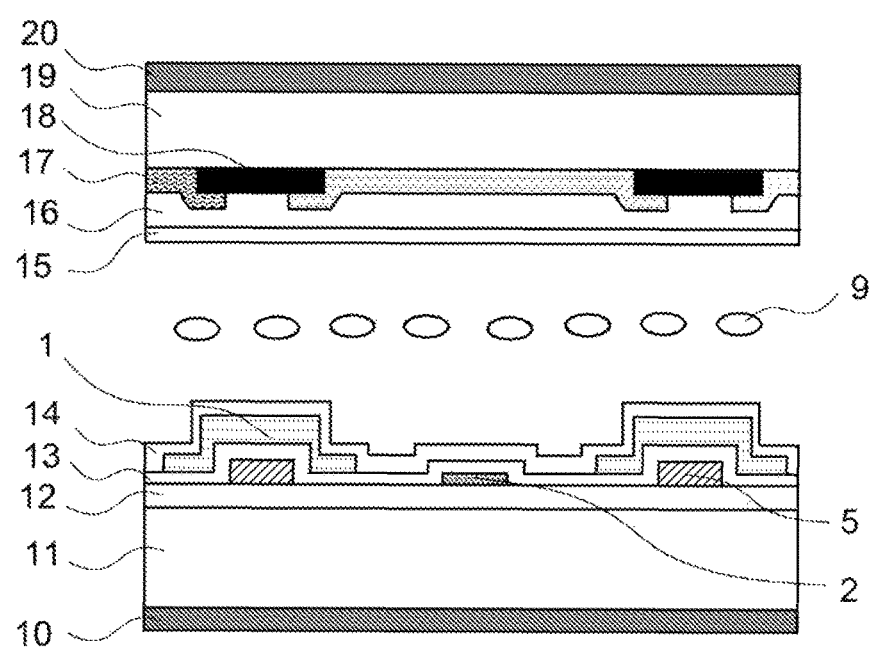
FIG. 2 is a cross-sectional view of the liquid crystal display device according to EXAMPLE 1, taken along line II-II in FIG. 1.
Figure 3:
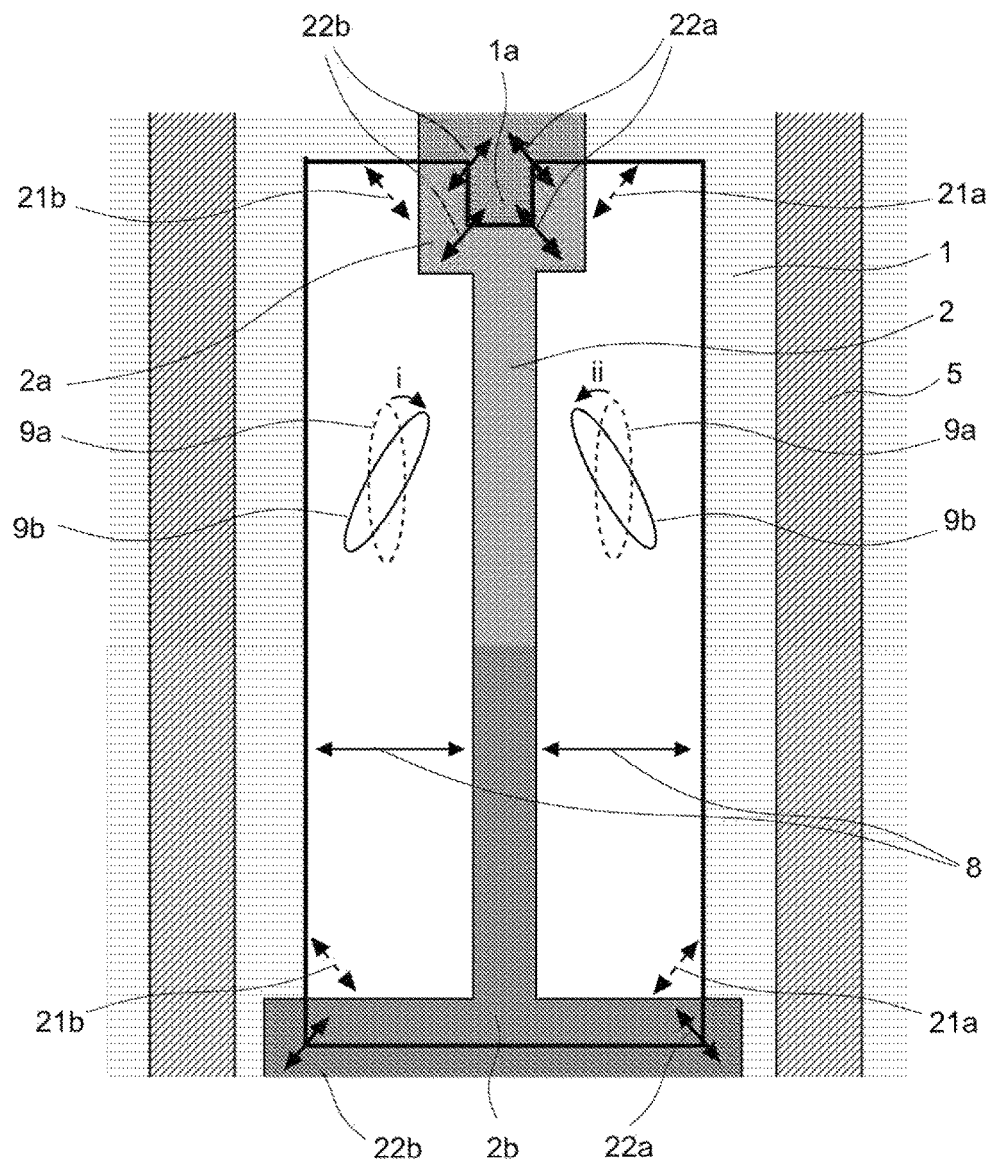
FIG. 3 is an enlarged view of columns and their circumference illustrated in FIG. 1 in the liquid crystal display device according to EXAMPLE 1.
Figure 4:
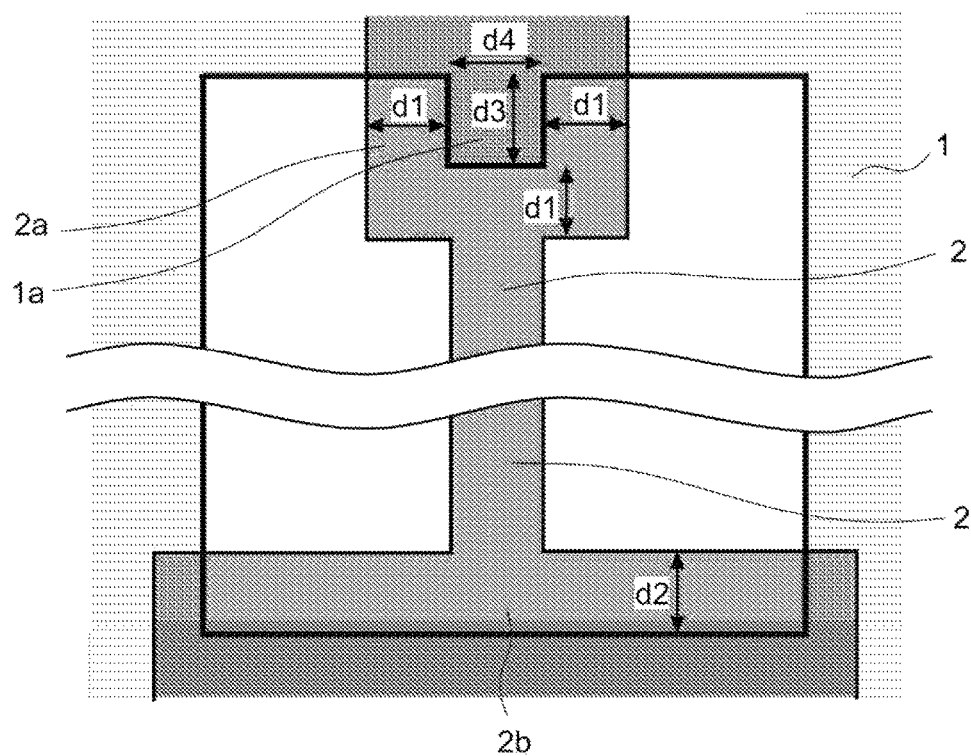
FIG. 4 is a further enlarged view of upper and lower parts of the pixel shown in FIG. 3 of the liquid crystal display device according to EXAMPLE 1.

An illustrative liquid crystal display device according to EXAMPLE 1 will be described now with reference to FIGS. 1 to 4. FIG. 1 is a plan view illustrating a structure of one pixel of a liquid crystal display device according to EXAMPLE 1, where unit pixel 27 is indicated by an area surrounded by broken lines. FIG. 2 is a cross-sectional view of the liquid crystal display device, taken along line II-II shown in FIG. 1, and further illustrates a liquid crystal layer and opposing substrates. FIG. 3 is an enlarged view of columns and their circumference shown in FIG. 1. FIG. 4 is a further enlarged diagram of upper and lower parts of the pixel in FIG. 3.

An illustrative liquid crystal display device according to EXAMPLE 1 shown in FIGS. 1 to 4 will be described now in detail. The liquid crystal display device includes first transparent insulating substrate 11, second transparent insulating substrate 19, and a layer of liquid crystal 9 put between the pair of substrates. On the first transparent insulating substrate 11, plural scanning lines 6 and plural data lines 5 are arranged to form plural pixels, where two neighboring scanning lines 6 and two neighboring data lines 5 that cross each other form the boundary of each pixel. There is further provided common electrode 1 having a grid form. The common electrode 1 is formed in a layer closer to the layer of liquid crystal 9 than the strip-shaped pixel electrodes 2 so as to cover the scanning lines 6 and the data lines 5. In each pixel, there are one strip-shaped pixel electrode 2 and parts of common electrode 1 covering the data lines 5, which are arranged so that the parts of common electrode 1 alternate with the strip-shaped pixel electrodes 2. The strip-shaped pixel electrode 2 is arranged in the middle of each pixel and extends along the extending direction of the data lines 5. The strip-shaped pixel electrode 2 is smaller in length of the longitudinal direction than a part of the common electrode 1 covering the data line 5. In each pixel, there is a rectangular pixel electrode (first rectangular pixel electrode 2b) connected to one end of the strip-shaped pixel electrode 2 to form a T shape. That is, the first rectangular pixel electrode 2b which is greater in width than a strip part of the strip-shaped pixel electrode is connected substantially perpendicularly (at right angles) to one end of the strip-shaped pixel electrode 2 to form a T shape. Furthermore, the first rectangular pixel electrode 2b overlaps with two corner parts of opening section 28 formed (surrounded) by the common electrode 1 in each pixel. In an area of each pixel on the side of the other end of the strip-shaped pixel electrode 2 in its longitudinal direction, there are provided a part of common electrode (protruding common electrode 1a) protruding inside opening section 28 from a part of common electrode 1 covering scanning line 6; and a rectangular pixel electrode (second rectangular pixel electrode 2a) connected to the other end of the strip-shaped pixel electrode. The rectangular pixel electrode (second rectangular pixel electrode 2a) is greater in size than the protruding part of common electrode (protruding common electrode 1a) and is arranged so as to cover the protruding part. In other words, the second rectangular pixel electrode 2a is greater in width than the strip part of the strip-shaped pixel electrode 2, is connected to the other end of the strip-shaped pixel electrode 2 to form a T shape, and covers the protruding common electrode 1a. In this structure, molecular orientation 7 of liquid crystal in this structure is in the extending direction of the strip-shaped pixel electrode 2.

Here, positional relationships between common electrode 1 covering scanning lines 6 and data lines 5, protruding common electrode 1a, strip-shaped pixel electrode 2, second rectangular pixel electrode 2a, and first rectangular pixel electrode 2b will be described in detail using FIG. 3 and FIG. 4. FIG. 3 is an enlarged view of columns and their circumference within a pixel illustrated in FIG. 1. FIG. 4 is a further enlarged view of the upper part and the lower part of the pixel illustrated in FIG. 3.

First, FIG. 3 will be described now. In a lateral-electric-field mode liquid crystal display device of having such a structure, a potential difference made between the common electrode 1 and strip-shaped pixel electrode 2 produces a lateral electric field 8. Other than the electric field, there are various electric field produced in a pixel, such as lateral electric fields 21a and 21b in regions where common electrode 1 is near one of second rectangular pixel electrode 2a and first rectangular pixel electrode 2b, and fringe electric fields 22a and 22b produced by one of common electrode 1 and the protruding common electrode 1a, and one of second rectangular pixel electrode 2a and first rectangular pixel electrode 2b. In special, the fringe electric fields 22a and 22b play an important role in the present example, for the following reason. In this structure, molecular orientation 7 of liquid crystal is perpendicular (at 90 degrees) to the direction of lateral electric field 8. The lateral electric field 8 produced in the structure acts on the liquid crystal in the initial orientation state to cause twist deformation. However, since the start of deformation due to the fringe electric field of 22a is earlier, liquid crystal located in the right column as shown in FIG. 3 is affected by the fringe electric field 22a and deforms in the direction of ii (from 9a to 9b). Liquid crystal located in the left column is similarly affected by the fringe electric field 22b and deforms in the direction of i (from 9a to 9b). That is, though the direction of the lateral electric field 8 is perpendicular (at 90 degrees) to the molecular orientation 7 of liquid crystal, the twist deformation orientation of the liquid crystal is different between two columns constituted by the strip-shaped pixel electrode 2 and the common electrode 1.

Giving a supplementary explanation, the liquid crystal located in the column at the right side of the strip-shaped pixel electrode 2 deforms in the direction of ii then, and the lateral electric field 21a in a direction opposite to this direction is produced in the column. However, since the lateral electric field 21a is weak as compared to the fringe electric field 22a which is in its immediate proximity, liquid crystal located in a region where the lateral electric field 21a is active does not cause deformation in the direction of the lateral electric field 21a, and thus the liquid crystal deforms in the direction of ii. Similarly, liquid crystal located in the column at the left of the strip-shaped pixel electrode 2 deforms in the direction of i, and the lateral electric field 21b in the direction opposite to this direction is produced in the column. However, since the lateral electric field 21b is also weak when compared to the fringe electric field 22b that is in immediate proximity of the lateral electric field 21b, liquid crystal located in a region where the lateral electric field 21b functions does not cause deformation in the direction of the lateral electric field 21b and deforms in the direction of i. To be exact, other than the fringe electric fields 22a and 22b in the oblique directions, there are produced other fringe electric fields in this pixel, which are fringe electric fields in the extending direction of data lines 5 and the extending direction of scanning lines 6. However, those fringe electric fields are omitted here since the fringe electric fields do not affect the twist deformation direction of the liquid crystal.

Next, FIG. 4 will be described now. FIG. 4 illustrates protruding common electrode 1a, second rectangular pixel electrode 2a and the first rectangular pixel electrode 2b. Distance d1 of an extending amount of the second rectangular pixel electrode 2a out from the protruding common electrode 1a and distance d2 of an extending amount of the first rectangular pixel electrode 2b out from the common electrode 1 should be at least 0 or larger than 0. Here, the distances are set at 2 μm. In addition, it is sufficient if the protruding distance d3 of the protruding common electrode 1a is from 2 μm to 3 μm. However, here the distance is set at 5 μm and the width d4 is set at 3 μm.

Outstanding viewing angle characteristics similar to the multi-domain structure in which electrodes are bent can be obtained through implementing the above pixel structure. This is because there are a plurality of columns having different twist deformation directions of the liquid crystal within a pixel. Furthermore, there is no reduction in the opening region since the edge part of each electrode are not formed in an oblique direction as described in the descriptions about FIGS. 21 and 22. In addition, since the liquid crystal twist direction is controlled by the fringe electric fields 22a and 22b, it is possible to obtain an IPS liquid crystal display device that is resistive to finger pressing marks and can realize a quick response.

Further, in the present example, common electrode 1 is located closer to the liquid crystal layer than pixel electrodes 2. By placing the common electrode 1 at a nearer position to the liquid crystal layer, an insulating film between pixel electrodes and common electrode 1 can be used in common with an interlayer insulating film between common electrode 1 and data lines 5. As a result, the pixel structure can be formed at a lower cost since the number of times of formation of the insulating layer can be lessened.

The above serves as a detailed description of a structure of EXAMPLE 1. An example of the manufacturing method will also be described now.

First, a glass substrate being first transparent insulating substrate 11 is prepared. On the substrate, a first metal layer formed of molybdenum alloy is formed to be 300 nm in thickness though a sputtering technique and is patterned into scanning lines 6.

Next, on the resulting structure, 100 nm thickness of silicon oxide is deposited to be a gate insulating film 12, and then 300 nm thickness of silicon nitride, 170 nm thickness of i-a-Si (intrinsic amorphous Silicon) and 30 nm thickness of n-a-Si (n-type amorphous Silicon) are deposited successively by a PCVD (Plasma Chemical Vapor Deposition) technique. Laminated films of i-a-Si and n-a-Si are partly removed by etching, leaving a portion that serves as a thin film semiconductor layer 4.

Next, on the resulting structure, a transparent electrically-conductive film made of a transparent material such as ITO (Indium Tin Oxide) is formed, and it is formed into 40 nm thickness of pixel electrodes each having a strip shape extending in a direction perpendicular (at 90 degrees) to the extending direction of scanning lines 6. In this process, second rectangular pixel electrodes 2a and first rectangular pixel electrodes 2b are also formed simultaneously at this time.

Next, a film of molybdenum alloy is formed as a second metal layer in a thickness of 300 nm and is patterned into data lines 5 and source electrodes 3. Each data line 5 is arranged so as not to overlap with strip-shaped pixel electrode 2, second rectangular pixel electrode 2a, and first rectangular pixel electrode 2b, and is arranged in parallel with strip-shape pixel electrode 2. Each source electrode 3 is arranged so as to have a region partly overlapping with the first rectangular pixel electrode 2b and to send an electric current to the first rectangular pixel electrode 2b. It should be noted that a TFT (Thin Film Transistor) is composed of a part of scanning line 6, gate insulating film 12, thin film semiconductor layer 4, a part of data line 5, and source electrode 3.

Next, an unnecessary part of the n-a-Si layer in the thin film semiconductor layer 4 of a TFT is removed by etching using the second metal layer as a mask.

Next, on the resulting structure, 500 nm thickness of silicon nitride is deposited to form a passivation film 13.

Next, in order to expose the metal layer in terminal portions of data lines 5 and scanning lines 6 that are led around the display screen, the corresponding parts of gate insulating film 12 and the passivation film 13 are removed by etching.

Next, 80 nm thickness of common electrode 1 is formed out of a transparent electrically-conductive film made of transparent material, such as ITO (Indium Tin Oxide), so as to cover scanning lines 6 and data lines 5. In this process, protruding common electrodes 1a are simultaneously formed at this time. Furthermore, the common electrode 1 is electrically-conductive with a common-electrode line via a contact hole, where the common-electrode line is formed out of the first metal layer and the second metal layer, or any one of the metal layers in the periphery of the display screen. The common electrode 1 may be patterned so as to cover a part of scanning lines 6 except an area directly above the channel section of each TFT.

On the resulting TFT-side substrate formed as described above, oriented film 14 is formed by application and baking process. Meanwhile, on the second transparent insulating substrate 19 which serves as an opposing substrate, there are formed black matrix 18, color layer 17 which serves as a color filter, overcoat 16, and pillar-shaped spacers (not illustrated in the drawings) to ensure a space between the opposing substrate and the TFT-side substrate. On the resulting structure, oriented film 15 is further formed by application and baking process. Then, rubbing treatment is carried out onto the orientated films 14 and 15 of both substrates in a direction perpendicular (at 90 degrees) to the extending direction of scanning lines 6 to define molecular orientation 7 of liquid crystal. Both substrates are adhered together and sealing material is solidified on the periphery of the joined substrates. Then, liquid crystal 9 is poured between the substrates and a sealing process is carried out. Herein, the liquid crystal cell gap is set at 3.5 μm, and liquid crystal 9 (positive liquid crystal) with refractive index anisotropy of Δn=0.09 and dielectric anisotropy of Δ∈=10 is used. The process of pouring in liquid crystal 9 is to be carried out taking sufficient injection time so that the liquid crystal 9 enters into the cell sufficiently. The sealing process is carried out while pressurizing such that there is a predetermined pressure in the liquid crystal cell. Of course, by using a liquid crystal dropping technique, it is also possible to carry out the steps of: filling the cell with liquid crystal 9; adhering both the substrates together; and sealing the periphery, after rubbing treatment for both the substrates.

On the TFT-side substrate of the liquid crystal display panel manufactured as described above, polarization plate 10 is adhered, where its polarization axis matches with molecular orientation 7 of liquid crystal being as the rubbing direction of the liquid crystal. On the opposing substrate, polarization plate 20 is adhered so as to form a crossed Nicols arrangement.

Furthermore, a necessary driver is mounted on the periphery of the liquid crystal display panel, and the liquid crystal display panel is assembled with a backlight and a signal processing board in an appropriate form, to manufacture an active matrix liquid crystal display device.

The liquid crystal display device operates in an IPS (In-Plane Switching) mode in which each pair of a part of common electrode 1 extending in the direction of data line 5 and strip-shaped pixel electrode 2 forms between them lateral electric field 8 that is substantially parallel to the surface direction of the substrates, and the lateral electric field 8 makes an in-plane twist deformation of liquid crystal which has been homogenously oriented in the rubbing direction, so that the amount of transmitted light for each pixel is controlled properly.

In this EXAMPLE 1, the resolution applied is of the horizontal resolution of 1024×3 (RGB) pixels and the vertical resolution of 768 lines, corresponding to XGA size. Pixel size is set at 69 µm, the data line width is set at 3 µm, the common electrode width on the data line is set at 9 µm, and the pixel electrode width is set at 3 µm. In this case, the gap between the strip-shaped pixel electrode 2 and a part of the common electrode 1 extending along the data line 5 is set at 5.5 µm.

The setting values described above are those just for use in this EXAMPLE 1. Those values are not limited in particular and should be set as appropriate. For example, the metal layer is made of molybdenum alloy in this EXAMPLE 1. However, the metal layer is not limited to this and may be made of aluminum alloy or the like. Further, in EXAMPLE 1, the manufacturing process takes the steps of after forming the thin film semiconductor layer 4, formation of pixel electrodes 2, source electrodes 3 and data lines 5 out of a transparent electrically-conductive film, and etching of an unnecessary part of the n-a-Si layer of the thin film semiconductor layer 4, in this order. However, the process is not limited to this. For example, the process may take the steps of after forming the thin film semiconductor layer 4, formation of source electrodes 3 and data lines 5, etching of an unnecessary part of the n-a-Si layer of the thin film semiconductor layer 4, and formation of pixel electrodes out of a transparent electrically-conductive film, in this order.

EXAMPLE 2

Figure 5:
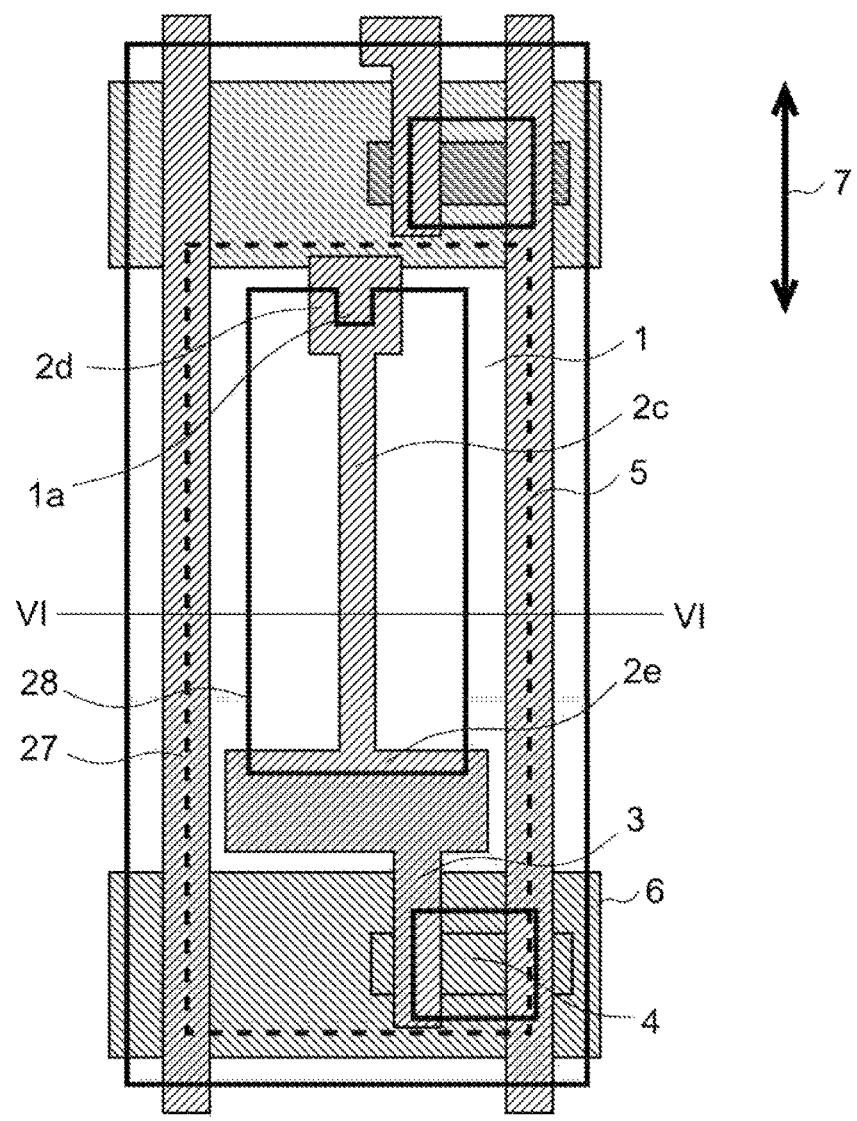
FIG. 5 is a plan view illustrating a structure of one pixel of a liquid crystal display device according to EXAMPLE 2.
Figure 6:
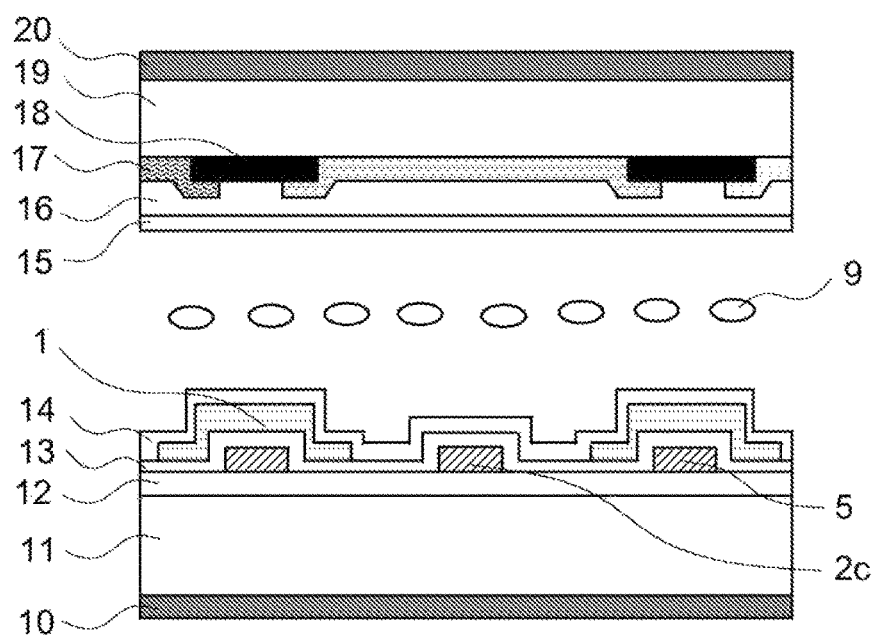
FIG. 6 is a cross-sectional view of the liquid crystal display device according to EXAMPLE 2, taken along line VI-VI in FIG. 5.
Figure 7:
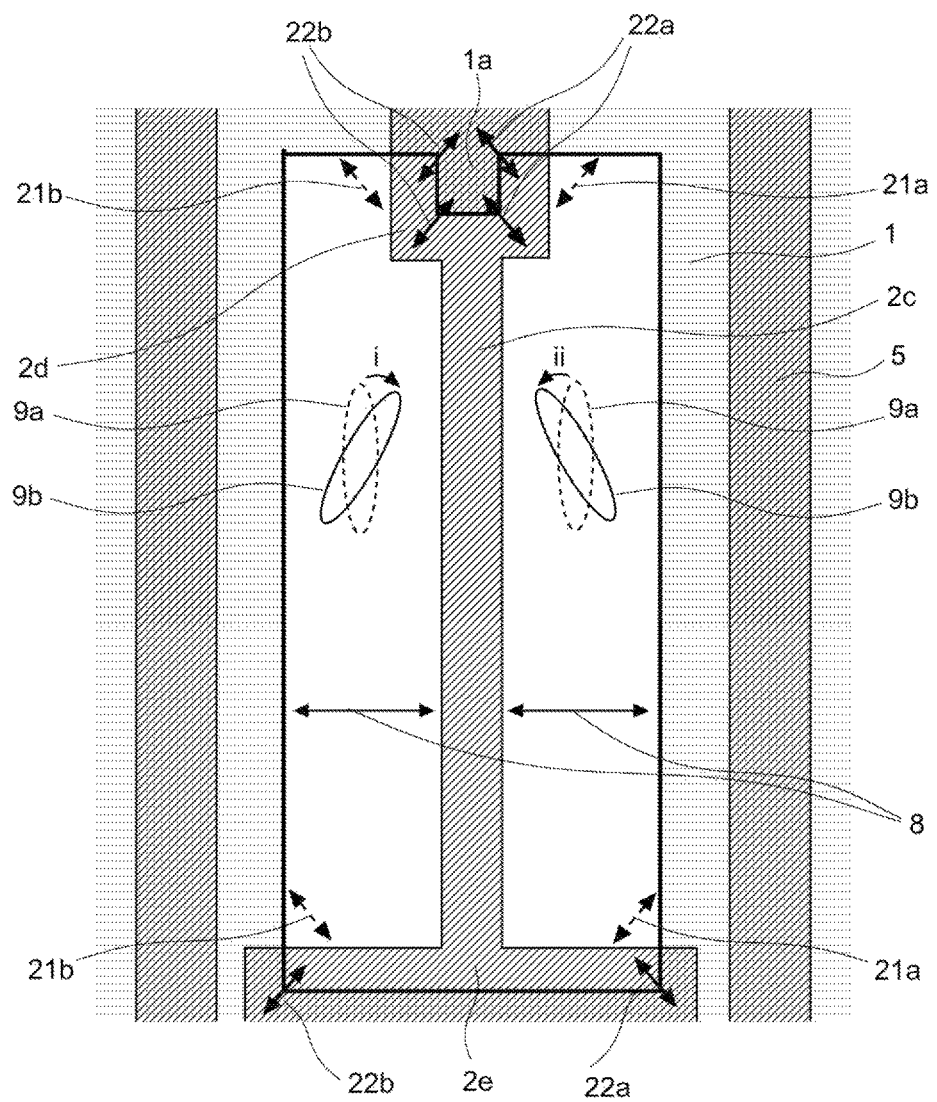
FIG. 7 is an enlarged view of columns and their circumference illustrated in FIG. 5 in the liquid crystal display device according to EXAMPLE 2.

EXAMPLE 2 will be described now using FIGS. 5, 6 and 7. FIG. 5 is a plan view illustrating a structure of one pixel of the liquid crystal display device according to EXAMPLE, where unit pixel 27 is indicated by an area surrounded by broken lines. FIG. 6 is a cross-sectional view taken along line VI-VI shown in FIG. 5 and further illustrates a liquid crystal layer and opposing substrates. FIG. 7 is an enlarged view illustrating columns and their circumference in a pixel in FIG. 6. EXAMPLE 2 shown in FIGS. 5, 6 and 7 will be described now in detail.

In EXAMPLE 1, the pixel electrodes are formed out of a transparent electrically-conductive film as shown in, for example, FIG. 1. Meanwhile, in EXAMPLE 2, the pixel electrodes are formed out of the second metal layer as shown in FIGS. 5, 6 and 7. That is, in the process of forming the second metal layer, data lines 5, source electrodes 3, strip-shaped pixel electrodes 2c, second rectangular pixel electrodes 2d, and first rectangular pixel electrodes 2e are simultaneously formed. Thereby, it is possible to omit the steps of forming and patterning a transparent electrically-conductive film in order to form pixel electrodes required in EXAMPLE 1. Accordingly, it is possible to obtain advantageous effects such as a reduction of tact time, lower costs due to reduced manufacturing steps, and a reduced defective fraction due to reduction of chances of a foreign object entering.

EXAMPLE 3

Figure 8:
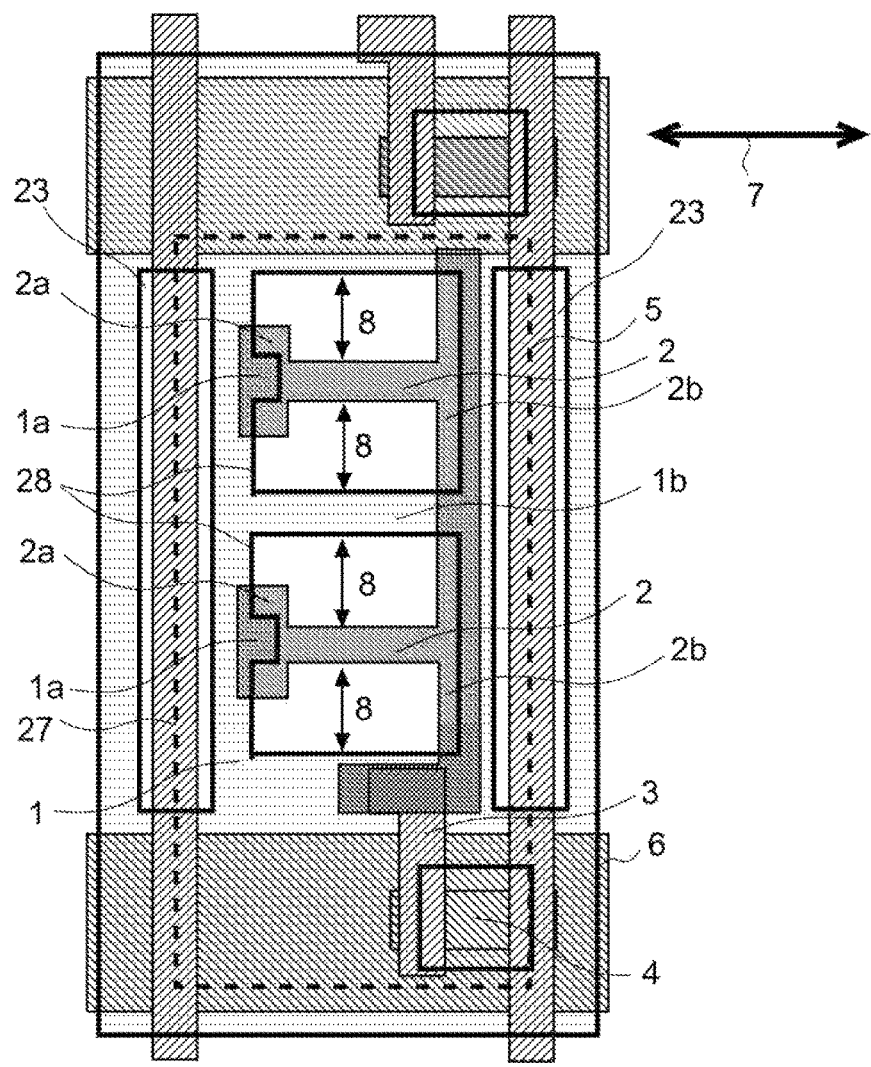
FIG. 8 is a plan view illustrating a structure of one pixel of a liquid crystal display device according to EXAMPLE 3.
Figure 9:
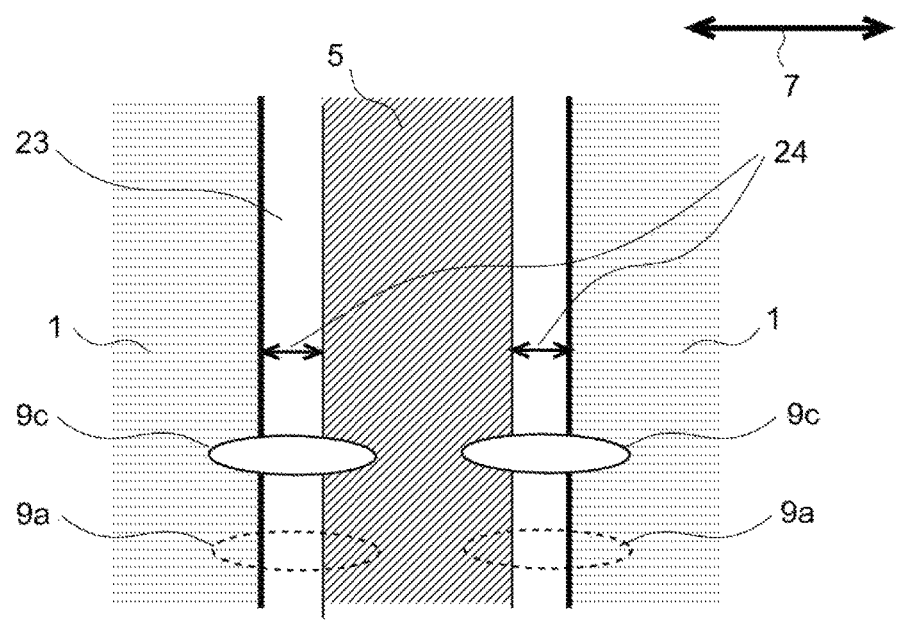
FIG. 9 is an enlarged view of a region on the circumference of data lines in FIG. 8 of the liquid crystal display device according to EXAMPLE 3.
Figure 10:
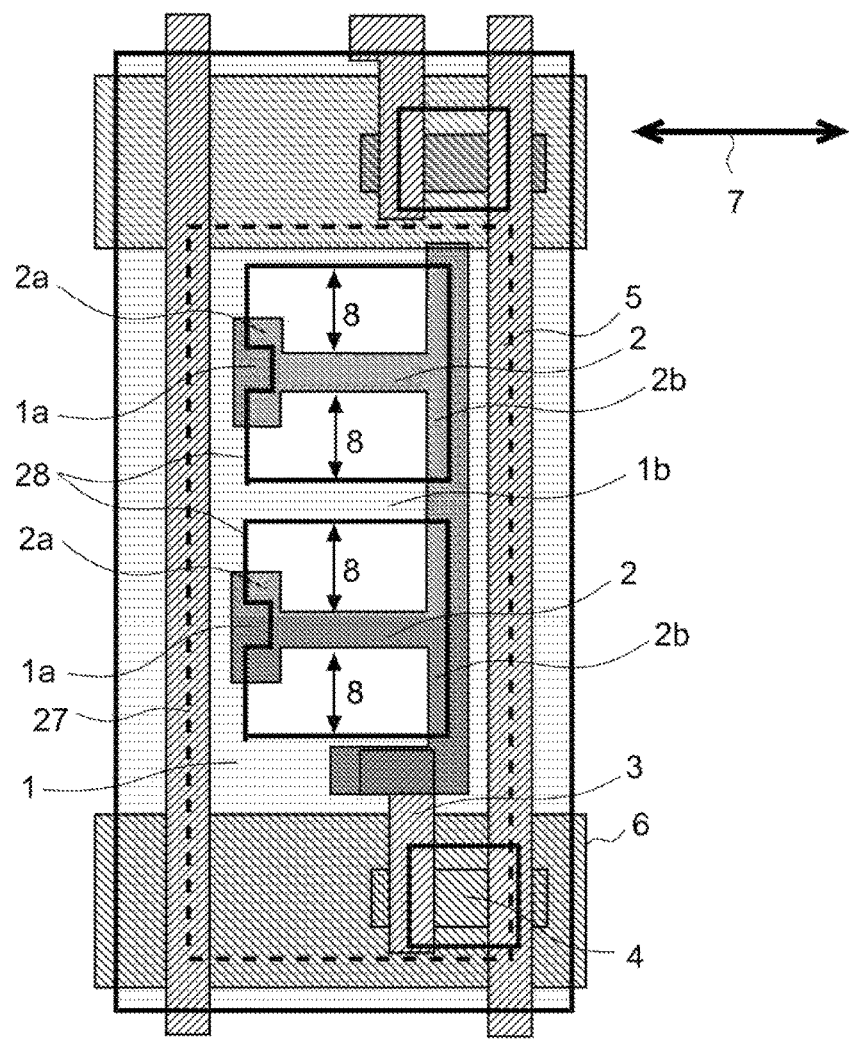
FIG. 10 is a plan view illustrating a structure of one pixel of a liquid crystal display device according to EXAMPLE 3, where a part of a common electrode arranged so as to cover the data lines, is not hollowed out.

EXAMPLE 3 will be described now using FIGS. 8, 9 and 10. FIG. 8 is a plan view illustrating a structure of one pixel of the liquid crystal display device according to EXAMPLE 3, where unit pixel 27 is indicated by an area surrounded by broken lines. FIG. 9 is an enlarged view illustrating a region around the circumference of data line 5 in FIG. 8. FIG. 10 is a plan view illustrating a modified structure of one pixel in which a part of the common electrode that covers the data line is not hollowed out, where unit pixel 27 is indicated an area surrounded by broken lines. EXAMPLE 3 shown in FIGS. 8, 9 and 10 will be described now in detail.

In EXAMPLE 1, strip-shaped pixel electrode 2 was arranged such that its extending direction is parallel to the extending direction of data lines 5, in each pixel. Meanwhile, in EXAMPLE 3, the strip-shaped pixel electrode 2 is arranged such that its extending direction is parallel to the extending direction of scanning lines 6 in each pixel as shown in FIG. 8. In each pixel, a plurality of strip-shaped pixel electrodes 2 are arranged, and strip-shaped common electrode 1b is further arranged in substantially the middle of the neighboring strip-shaped pixel electrodes 2. In this structure, neighboring first rectangular pixel electrodes 2b are connected together, and both end portions of the strip-shaped common electrode 1b are connected to common electrode 1 having a grid form. FIG. 8 illustrates a situation where two strip-shaped pixel electrodes 2 and one strip-shaped common electrode 1b are arranged in one pixel. However, three or more strip-shaped pixel electrodes 2 may be arranged in one pixel and strip-shaped common electrode 1b may be arranged between each pair of neighboring strip-shaped pixel electrodes 2.

Furthermore, a part of common electrode 1 which was prepared to cover the data line in the above examples can include a hollowed region 23 if molecular orientation 7 of liquid crystal is set to be the same as the extending direction of strip-shaped common electrodes 1b and strip-shaped pixel electrodes 2. The reason will be described now using FIG. 9. FIG. 9 is an enlarged view of a region around the data line 5 in FIG. 8. The molecular orientation 7 of liquid crystal is perpendicular (at 90 degrees) to the extending direction of data lines 5 and the initial orientation state 9a of the liquid crystal is as shown in FIG. 9. When a driving signal is input into the data line 5 in this structure, electric field 24 acts between the data line 5 and the common electrode 1. However, since the direction of the electric field 24 is the same as molecular orientation 7 of liquid crystal, the liquid crystal becomes in state 9c where the twist deformation is not carried out. Therefore, since the liquid crystal located in the hollowed out region 23 of the common electrode does not cause twist deformation even when a driving signal is input into the data line 5, and light does not pass through this region, which does not cause deterioration of image quality.

Accordingly, in EXAMPLE 3, the region where the common electrode 1 is arranged over the data line is reduced and the capacity to be provided between the data line 5 and the common electrode 1 is reduced also, and thus there is an advantageous effect of reducing an unintended capacity coupling. As a result, the image quality degradation resulting from fluctuation of the common electrode potential under the influence of data signals is suppressed and low power consumption can be attained due to reduction of load carrying capacity. Of course, there is no problem with regards to a display element if a part of common electrode 1 that is arranged to cover the data line 5 as shown in FIG. 10 is not hollowed out. In EXAMPLE 3, strip-shaped pixel electrode 2 and strip-shaped common electrode 1b are formed in a direction parallel to the extending direction of the scanning line 6s in each pixel. However, the strip-shaped pixel electrode 2 and the strip-shaped common electrode 1b may be formed so as to extend in a direction parallel to the extending direction of data lines 5.

EXAMPLE 4

Figure 11:
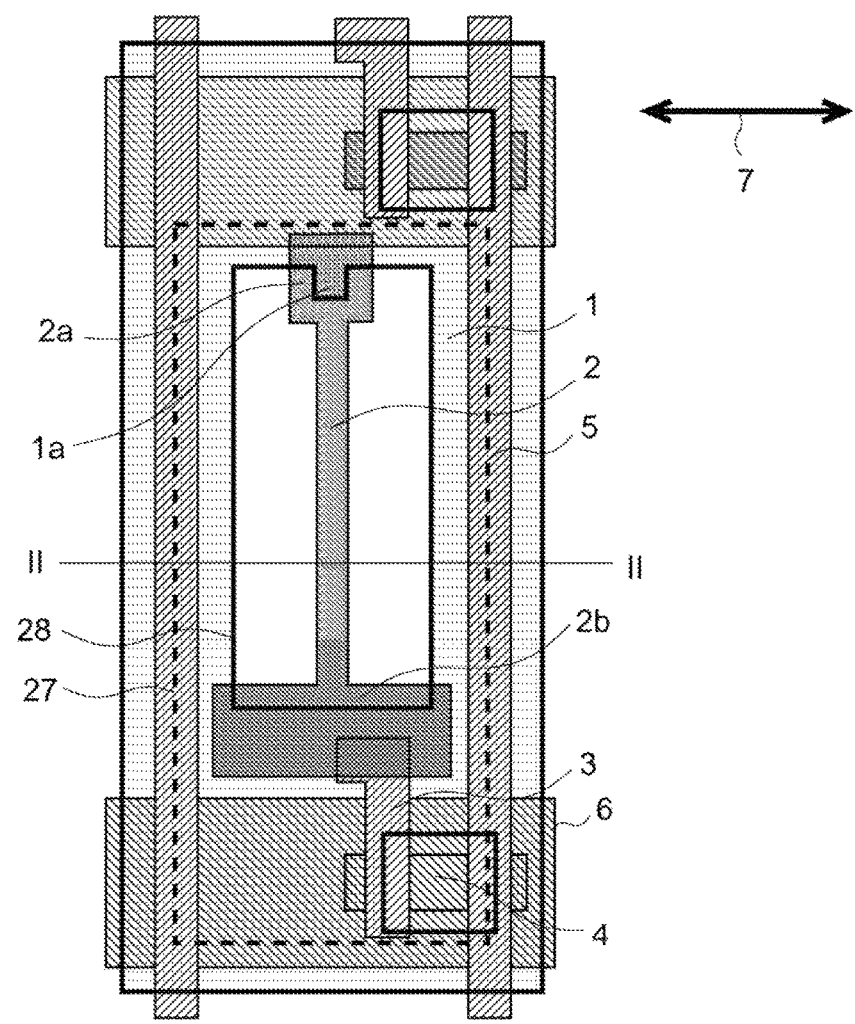
FIG. 11 is a plan view illustrating a structure of one pixel of a liquid crystal display device according to EXAMPLE 4.
Figure 12:
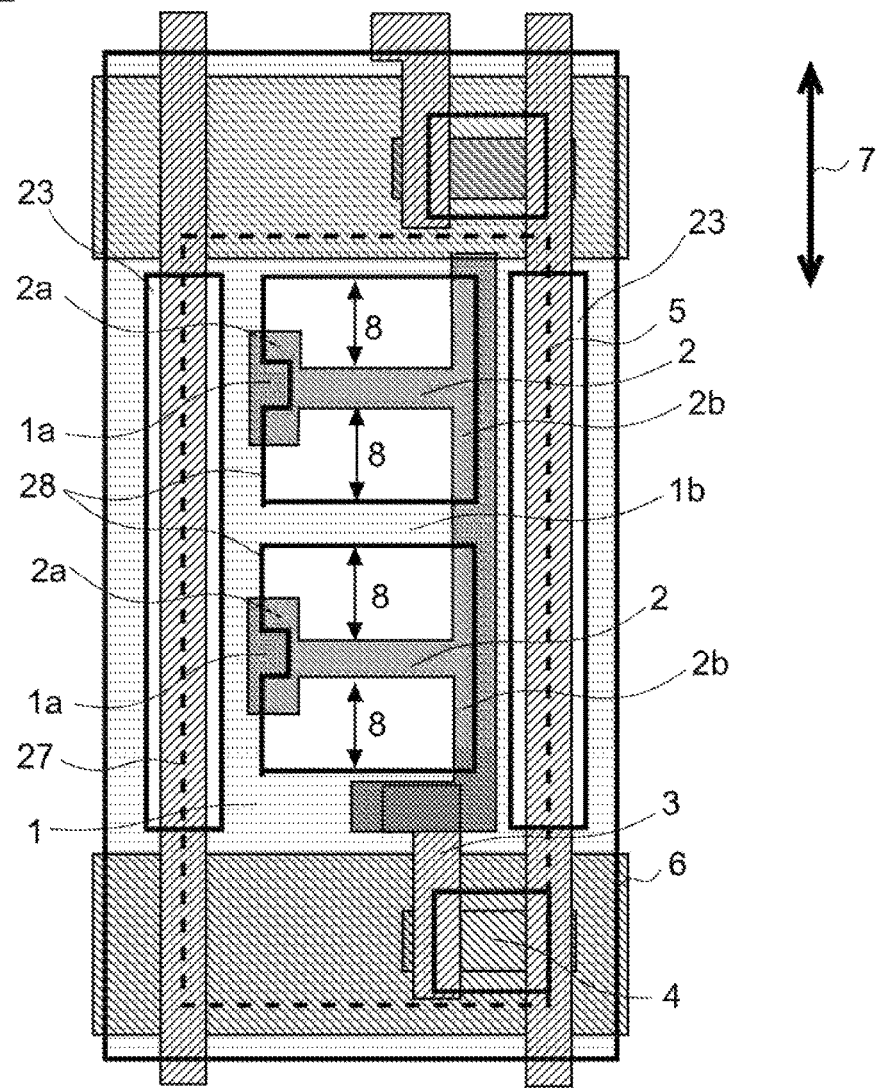
FIG. 12 is a plan view illustrating another structure of one pixel of a liquid crystal display device according to EXAMPLE 4.

EXAMPLE 4 will be described now using FIGS. 11 and 12. FIG. 11 and FIG. 12 are plan views illustrating a structure of one pixel of the liquid crystal display device according to EXAMPLE 4, where unit pixel 27 is indicated by an area surrounded by broken lines. EXAMPLE 4 shown in FIG. 11 and FIG. 12 will be described now in detail.

In EXAMPLES 1 to 3, it is necessary to use positive liquid crystal since molecular orientation 7 of liquid crystal and lateral electric field 8 are perpendicular (at 90 degrees) to each other. Meanwhile, in EXAMPLE 4, molecular orientation 7 liquid crystal of and lateral electric field 8 are in parallel to each other as shown in FIGS. 11 and 12, and thus there is a need to use a negative liquid crystal. The electrode structure as shown in FIG. 11 and FIG. 12 produces a very small amount of an electric field with a component in a direction perpendicular to the substrate surface. The negative liquid crystal in homogeneous alignment hardly causes deformation on such an electric field in the vertical direction. Therefore, since the negative liquid crystal in homogeneous alignment causes twist deformation with respect to the electric field in a direction parallel to the substrate surface, it becomes possible to obtain an IPS liquid crystal display device having an excellent viewing angle characteristics.

EXAMPLE 5

Figure 13:
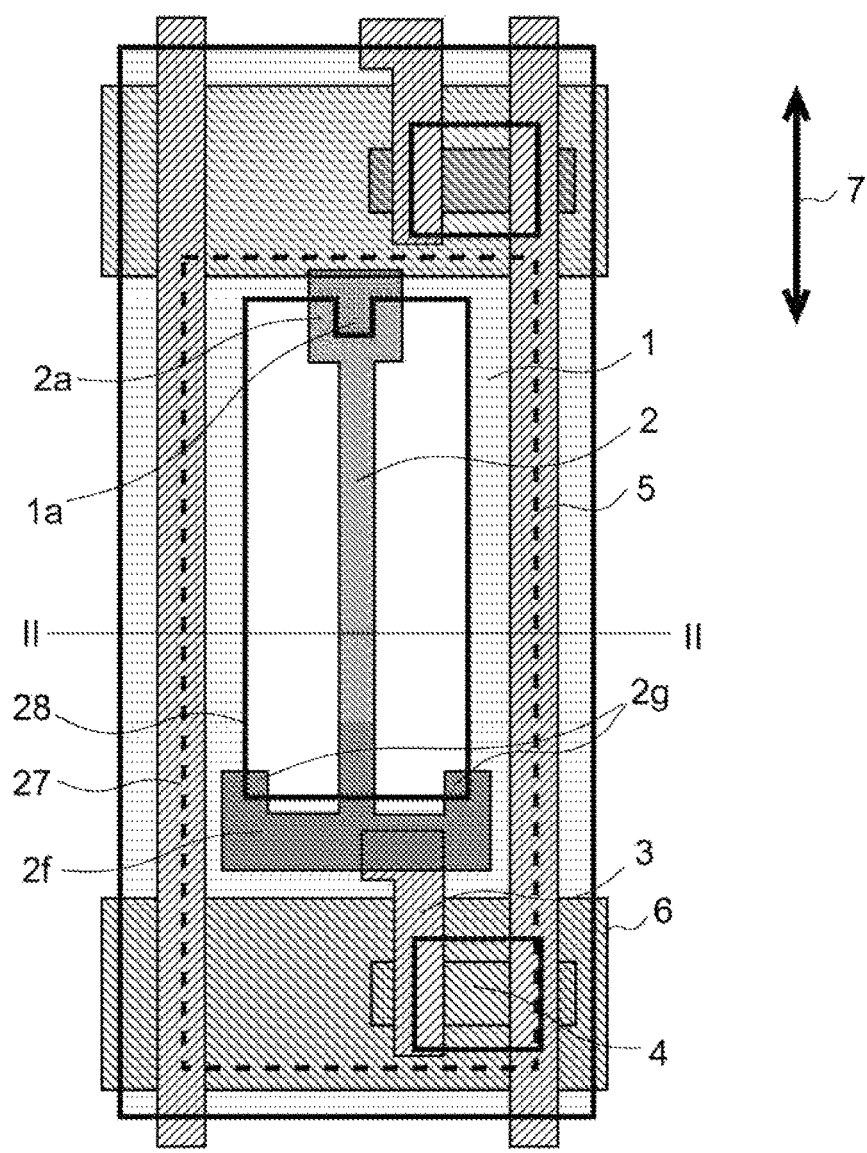
FIG. 13 is a plan view illustrating a structure of one pixel of a liquid crystal display device according to EXAMPLE 5.
Figure 14:
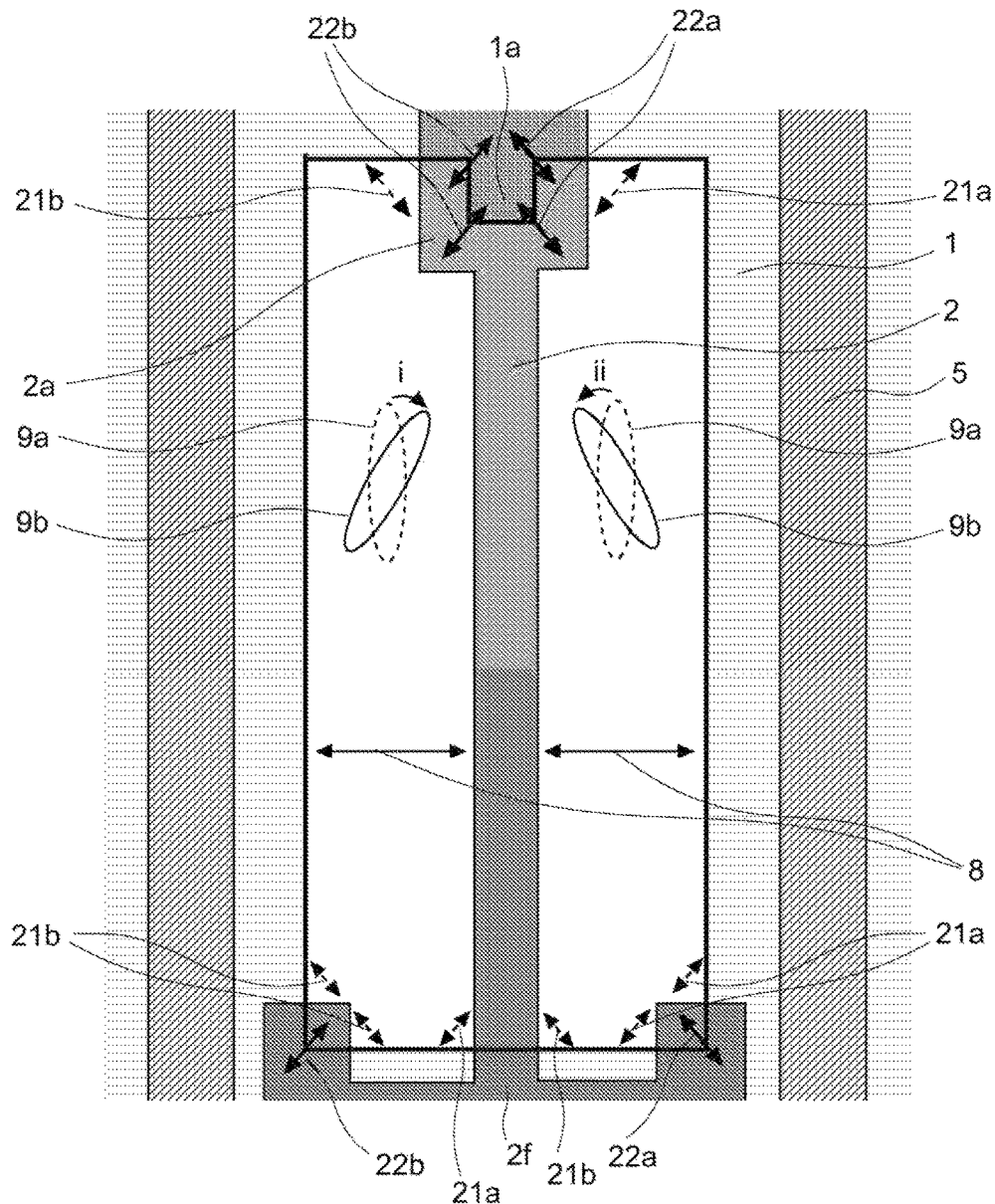
FIG. 14 is an enlarged view of columns and their circumference illustrated in FIG. 13 in the liquid crystal display device according to EXAMPLE 5.
Figure 15:
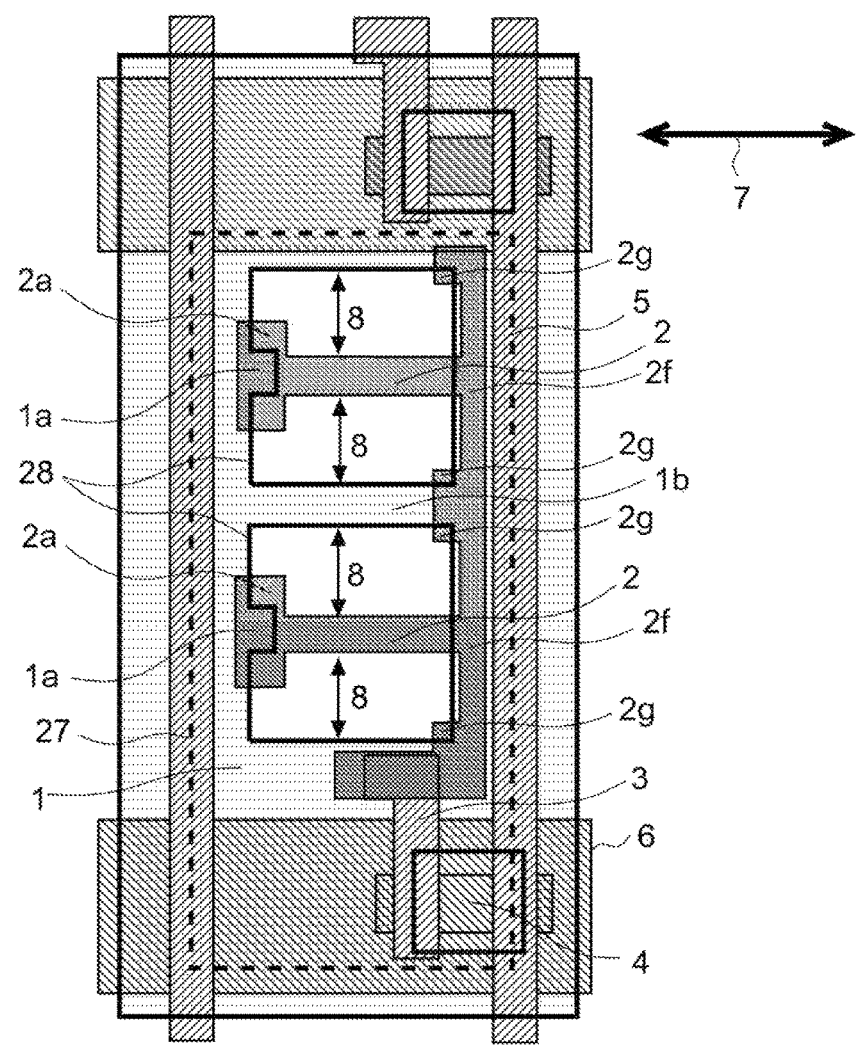
FIG. 15 is a plan view illustrating another structure of one pixel of a liquid crystal display device according to EXAMPLE 5.
Figure 16:
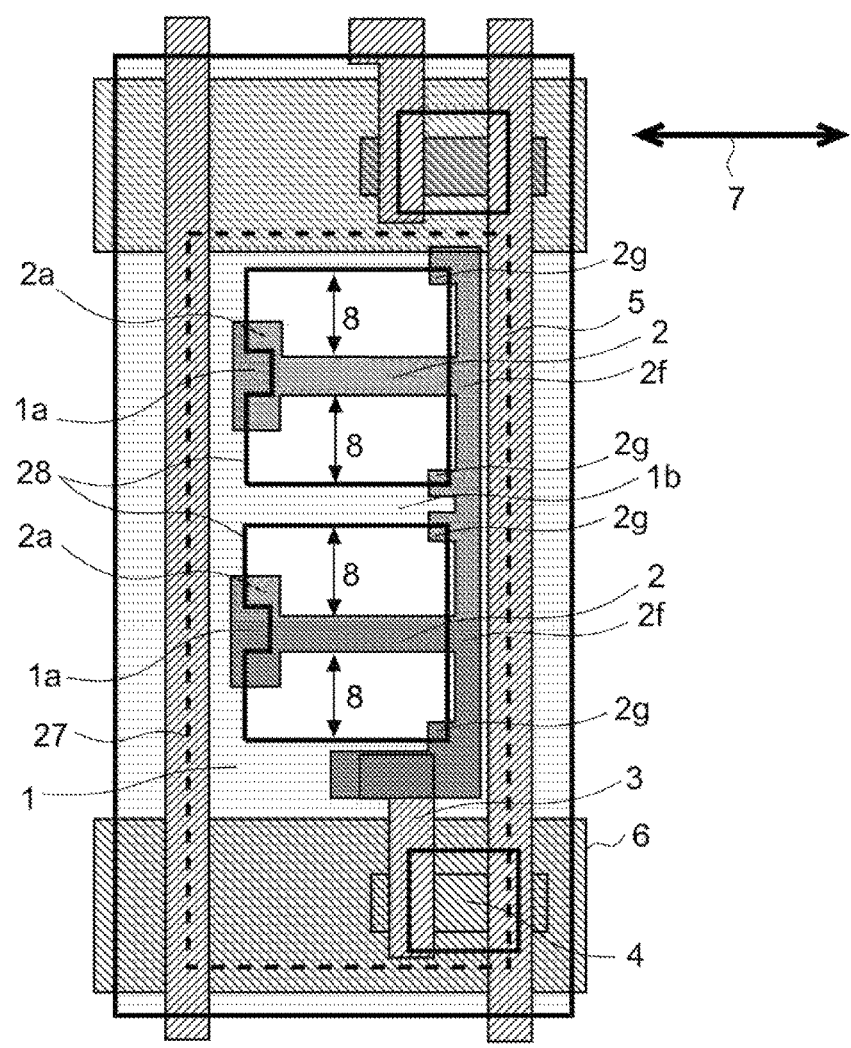
FIG. 16 is a plan view illustrating another structure of one pixel of a liquid crystal display device according to EXAMPLE 5.

EXAMPLE 5 will be described now using FIGS. 13 to 16. FIG. 13 is a plan view illustrating a structure of one pixel of the liquid crystal display device according to EXAMPLE 5, where unit pixel 27 is indicated by an area surrounded by broken lines. FIG. 14 is an enlarged view of columns and their circumference within a pixel in FIG. 13. FIG. 15 and FIG. 16 are plan views illustrating another structure of one pixel of the liquid crystal display device according to EXAMPLE 5, where unit pixel 27 is indicated by an area surrounded by broken lines. EXAMPLE 5 shown in FIGS. 13 to 16 will be described now in detail.

Common electrode 1 is arranged so as to cover data lines 5 and scanning lines 6, and the strip-shaped pixel electrode 2 is arranged in the central region of each pixel so as to extend along the extending direction of data lines 5. The common electrode 1 includes a protruding region (part) arranged in the upper part of each pixel as shown in FIG. 13. Connected with strip-shaped pixel electrode 2, second rectangular pixel electrode 2a is arranged in the upper part of the pixel so as to extend or protrude outside the protruding common electrode 1a. In each pixel, in a lower part of the pixel in FIG. 13, there is formed projecting-shaped pixel electrode 2f which includes projection regions (projecting parts 2g) each projecting from the corner part of opening section 28 of common electrode 1. The projecting-shaped pixel electrode 2f is connected to the strip-shaped pixel electrode 2. As shown in FIGS. 13 and 14, the projecting-shaped pixel electrode 2f and the strip-shaped pixel electrode 2 are connected at a position outside the opening section 28 of the common electrode 1. By having such a structure, a part of the common electrode 1 covering the scanning line 6 and the strip-shaped pixel electrode 2 cross at substantial right angles, in the lower area of the pixel in FIG. 13. In the present example, the electrode for connecting the strip-shaped pixel electrode 2 and the projecting-shaped pixel electrode 2f together is formed in a rectangular shape. However, its shape need not be a rectangle.

In the lateral-electric-field mode liquid crystal display device having such a structure, the situation of deformation of the liquid crystal in the upper part of the column is similar to the description of EXAMPLE 1. However, in the lower part of the column, there are lateral electric fields 21a and 21b in a region where the common electrode 1 and a projecting-shaped pixel electrode 2f are close with each other, and fringe electric fields 22a and 22b produced from the common electrode 1 and the projecting-shaped pixel electrode 2f. The liquid crystal located in the left column is affected by the fringe electric field of 22b so as to deform in the direction of i (from 9a to 9b). The lateral electric field 21b is produced near the fringe electric field 22b. However, since the lateral electric field 21b is weak as compared to the fringe electric field 22b, liquid crystal located in a region where the lateral electric field 21b acts does not cause deformation in the direction of the lateral electric field 21b and deforms in the direction of i. Furthermore, in the lower part of the left column, the lateral electric field 21a is produced in a region where the common electrode 1 and the strip-shaped pixel electrode 2 are close with each other. Such an electric field has an advantageous effect of strengthening the deformation of the liquid crystal in the left column in the direction of i. Similarly, the liquid crystal located in the right column is affected by the fringe electric field of 22a to be deformed in the direction of ii (from 9a to 9b). The lateral electric field 21a is produced near the fringe electric field 22a. However, since the lateral electric field 21a is weak as compared with the fringe electric field 22a, the liquid crystal located in a region where the lateral electric field 21a acts does not cause deformation in the direction of the lateral electric field 21a, and deforms in the direction of ii. Furthermore, in the lower part of the right column, the lateral electric field 21b is produced in a region where the common electrode 1 and the strip-shaped pixel electrode 2 are close with each other. Such an electrical field has an advantageous effect of further strengthening the deformation of the liquid crystal in the right column in the direction of ii.

The present example uses, in each pixel, projecting parts 2g each of which projects inside opening section 28 from a corner part of the opening section 28 of common electrode 1 even if their projection amount is small, and the shape of the projecting part 2g is not limited to a rectangular shape in particular. The present example has described a case where the projecting-shaped pixel electrode 2f includes recesses at both sides of the intersection part in the T shape. However, the projecting-shaped pixel electrode 2f may include only one recess at one side of the intersection part. Furthermore, as in EXAMPLE 2, the present example can be applied to a case (the case of FIG. 5) where strip-shaped pixel electrodes 2, projecting-shaped pixel electrodes 2f, and second rectangular pixel electrodes 2d are formed in a process forming the second metal layer in which data lines 5 are patterned.

Further, as in EXAMPLE 3, the present example can be applied to a case that strip-shaped pixel electrodes 2 are formed to extend in the direction in parallel with the extending direction of scanning lines 6, or a case as illustrated in FIGS. 15 and 16, that strip-shaped common electrode 1b is arranged in the middle of plural (two in FIGS. 15 and 16) strip-shaped pixel electrodes 2 in each pixel, neighboring projecting pixel electrodes 2f are connected to each other, and both end portions of strip-shaped common electrode 1b are connected to common electrode 1 (this case can include the situation that a part of common electrode 1 covering data line 5 is hollowed out or the situation that is not hollowed out). Further, as in EXAMPLE 4, the present example can also be applied to a case that molecular orientation 7 of liquid crystal and lateral electric field 8 are parallel to each other (case of FIG. 11 or FIG. 12).

EXAMPLE 6

Figure 17:
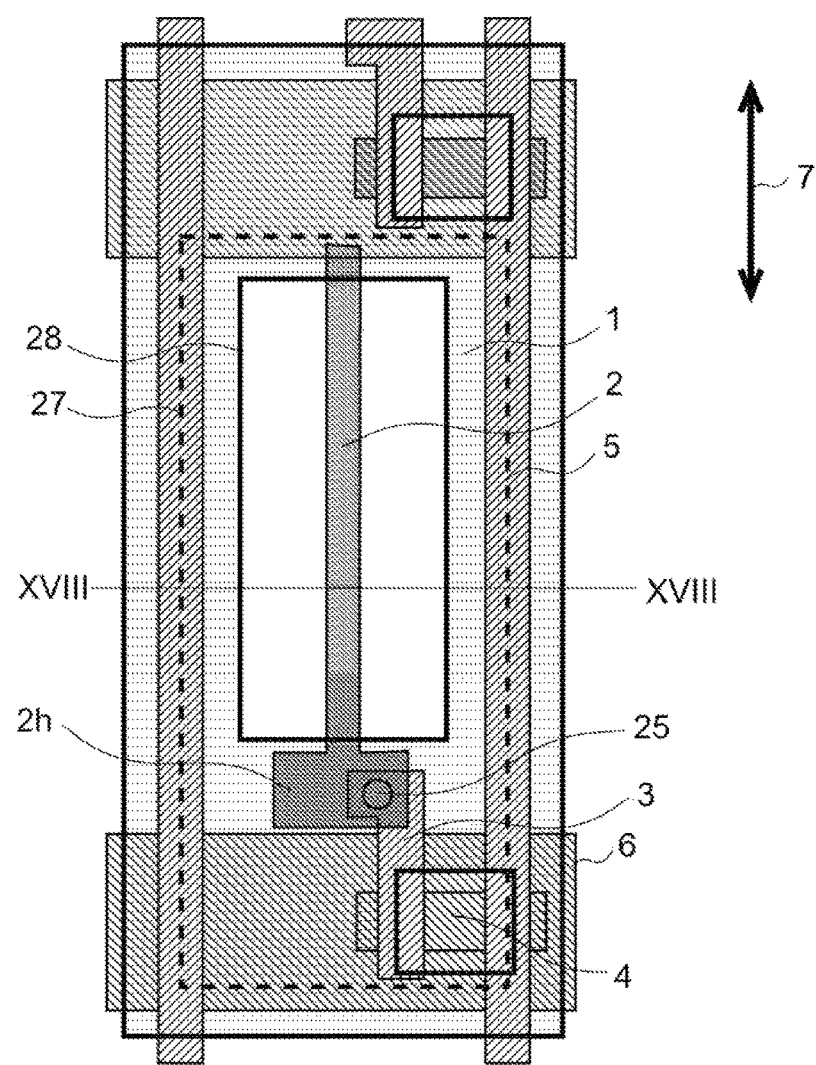
FIG. 17 is a plan view illustrating a structure of one pixel of a liquid crystal display device according to EXAMPLE 6.
Figure 18:
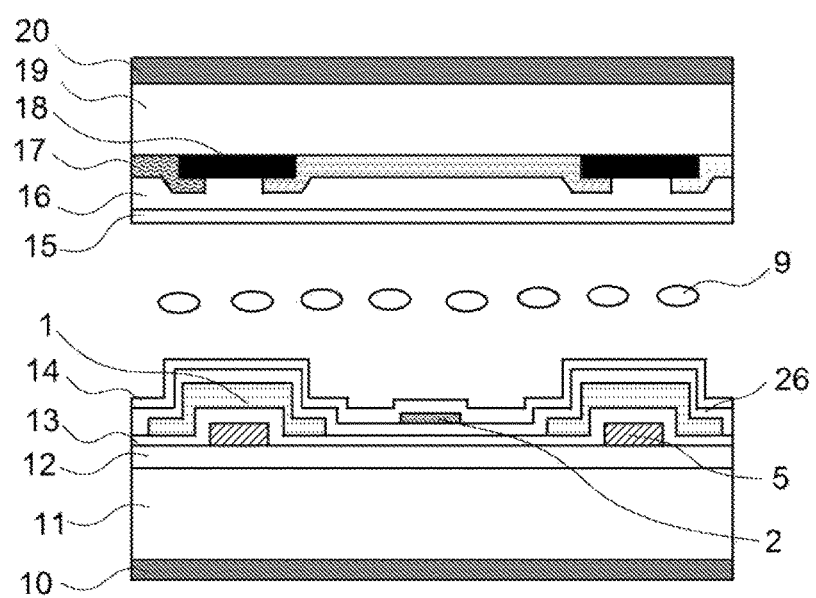
FIG. 18 is a cross-sectional view of the liquid crystal display device according to EXAMPLE 6, taken along line XVIII-XVIII in FIG. 17.
Figure 19:
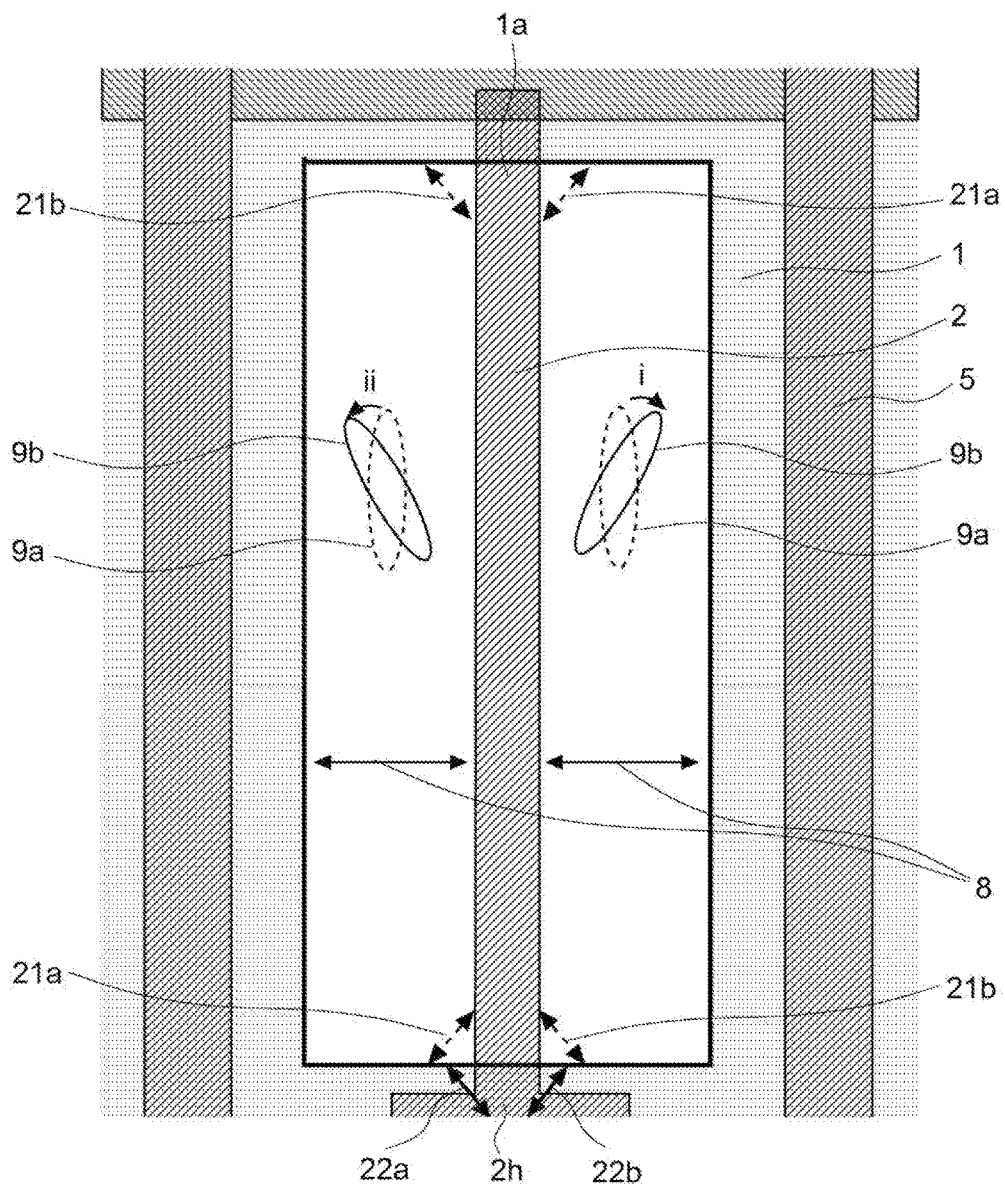
FIG. 19 is an enlarged view of columns and their circumference illustrated in FIG. 17 in the liquid crystal display device according to EXAMPLE 6.
Figure 20:
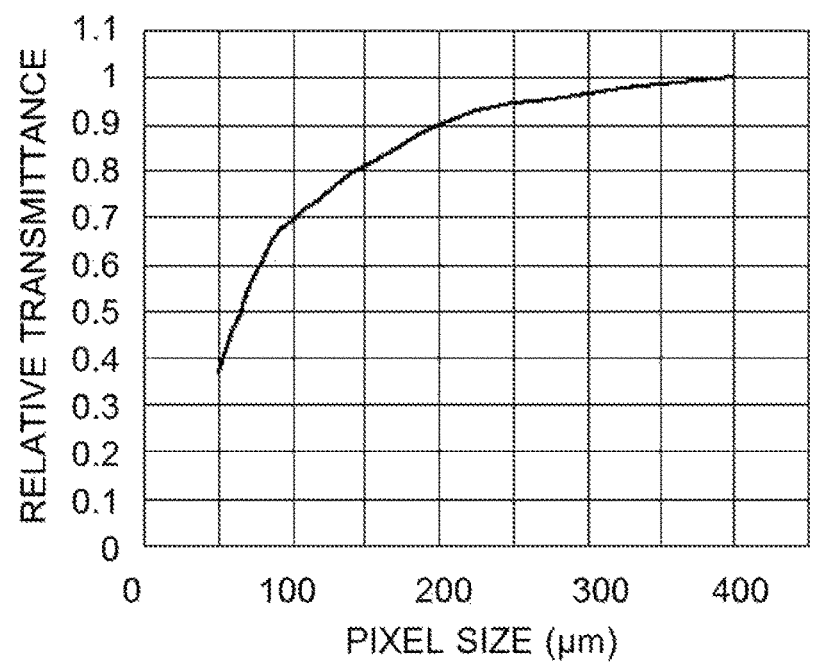
FIG. 20 is a graph illustrating a relationship between the aperture ratio and the pixel size of a liquid crystal display device.
Figure 23:
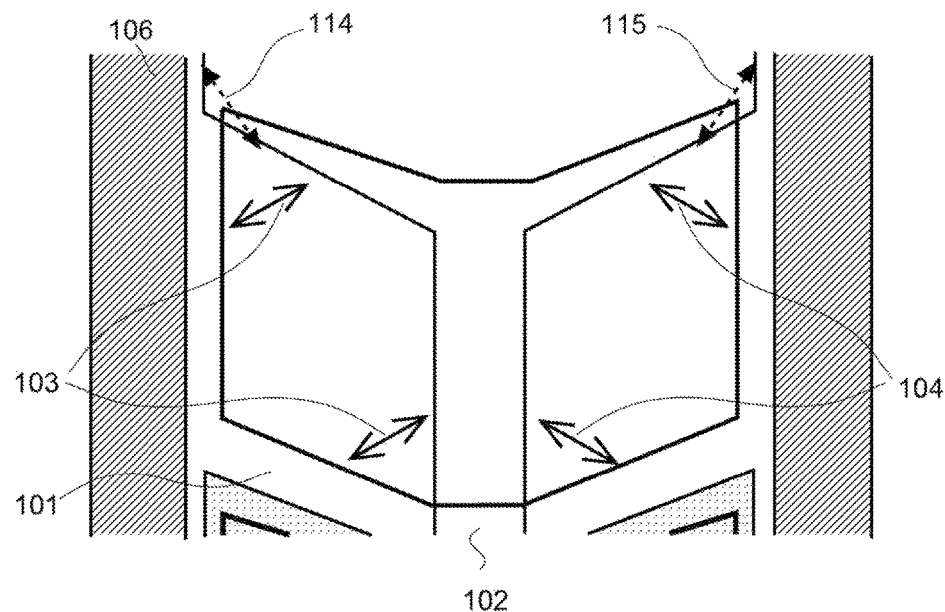
FIG. 23 is an enlarged view of a region surrounded with broken lines in FIG. 22.
Figure 24:
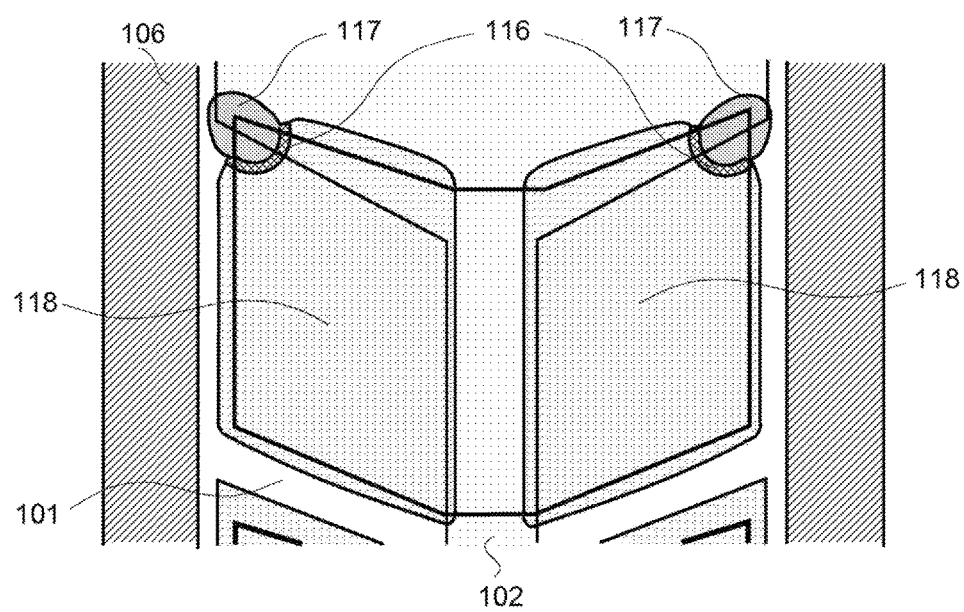
FIG. 24 is a plan view illustrating situations of disclination, a reverse rotation domain and a forward rotation domain in FIG. 23.

EXAMPLE 6 will be described now using FIGS. 17, 18 and 19. FIG. 17 is a plan view illustrating a structure of one pixel of the liquid crystal display device according to EXAMPLE 6 where unit pixel 27 is indicated by an area surrounded by broken lines). FIG. 18 is a cross-sectional view taken along line XVIII-XVIII shown in FIG. 17 and further illustrates a liquid crystal layer and opposing substrates. FIG. 19 is an enlarged view of columns and their circumference in a pixel in FIG. 17. EXAMPLE 6 illustrated in FIG. 17, FIG. 18 and FIG. 19 will be described now in detail.

In EXAMPLE 1, since the pixel electrodes and the data lines 5 are formed in the same layer, there may be a short circuit due to a pattern collapse. In EXAMPLE 6, in order to suppress the short circuit between the pixel electrodes and the data lines 5, the pixel electrodes are arranged in a layer above common electrode 1, and transparent insulating film 26 is formed on common electrode 1. Furthermore, a contact hole 25 is provided in passivation film 13 and transparent insulating film 26 to provide electrical conductivity between the strip-shaped pixel electrodes and the source electrode 3 in each pixel. Thereby, it is possible to suppress deterioration of the display image quality due to a short circuit between the pixel electrodes and the data lines 5. Further, connected with strip-shaped pixel electrode 2, rectangular pixel electrode 2h is arranged in the layer above common electrode 1 and in the lower part of the pixel in FIG. 17 so as not to extend outside the common electrode 1 (toward the inside of the opening section 28). Rectangular pixel electrode 2h and source electrode 3 may be electrically connected via the contact hole 25. In the upper part of the pixel of FIG. 17, the strip-shaped pixel electrode 2 is arranged above the common electrode 1 so as to overlap with the common electrode 1.

In a lateral-electric-field mode liquid crystal display device having such a structure, the situations of the deformation of the liquid crystal in the upper part of the column is such that, in the left column, a lateral electric field 21b is produced so as to promote the deformation of the liquid crystal in the column in the direction of ii (from 9a to 9b), and in the right column, a lateral electric field 21a is produced so as to promote the deformation of the liquid crystal in the column in the direction of i (from 9a to 9b). On the other hand, situations of deformation of the liquid crystal in the lower part of the column is such that, in the left column, a fringe electric field 22a is produced so as to promote deformation of the liquid crystal in the column in the direction of ii, and in the right column, a fringe electric field 22b is produced so as to promote deformation of the liquid crystal in the direction of i. Since the lateral electric field 21a produced near the fringe electric field 22a is weak as compared to the fringe electric field 22a, liquid crystal located in a region where the lateral electric field 21a acts does not cause deformation in the direction of the lateral electric field 21a and deforms in the direction of ii. Similarly, since the lateral electric field 21b produced near the fringe electric field 22b is weak as compared to the fringe electric field 22b, liquid crystal located in a region where the lateral electric field 21b acts does not cause deformation in the direction of the lateral electric field 21b and deforms in the direction of i.

The manufacturing method of the liquid crystal display device of the present example is the same until the step of forming the thin film semiconductor layer 4 shown in EXAMPLE 1. Thereafter, source electrodes 3 and data lines 5 are formed of 300 nm thickness of layer of molybdenum alloy. After etching an unnecessary part of the n-a-Si layer of the thin film semiconductor layer 4, 300 nm thickness of silicon nitride is deposited as a passivation film 13.

Next, common electrode 1 is formed on the resulting structure. A transparent electrically-conductive film, such as an ITO (Indium Tin Oxide) film, is formed to be a thickness of 80 nm, and is patterned into a shape covering scanning lines 6 and data lines 5.

Next, a transparent insulating film 26 is formed out of a silicon nitride film having a thickness of 300 nm. Thereafter, contact hole 25 is formed on the source electrode 3 into the passivation film 13 and the transparent insulating film 26. At the same time, parts of gate insulating film 12, passivation film 13, and transparent insulating film 26, which are necessary for exposing the metal layer on the terminal portions of the scanning line 6 and the data line 5 that have been led around the display screen, are removed by etching.

Next, a transparent electrically-conductive film, such as an ITO (Indium Tin Oxide) film, is formed and patterned into striped-shaped structures having a thickness of 300 nm and extending in a direction perpendicular to the extending direction of scanning lines 6 to form strip-shaped pixel electrodes 2. In this process, rectangular pixel electrodes 2h are formed at the same time. Further, the common electrode 1 is electrically-connected to the common-electrode line formed by the first metal layer and the second metal layer on the periphery of the display screen via a contact hole and the transparent electrically-conductive film being an upper layer. However, detailed illustrations in the drawings are omitted.

In present example, as described above, the pixel electrodes is located closer to the liquid crystal layer than common electrode 1. In order to locate the pixel electrodes nearer to the liquid crystal layer, an insulating layer is formed between the pixel electrodes and the data lines 5. Thus, a short circuit between the pixel electrodes and the data lines 5 due to a pattern collapse of the pixel electrodes or the data lines 5 can be prevented. In this example, strip-shaped pixel electrode 2 is formed in parallel with the extending direction of the data lines 5 in each pixel. However, it is also possible to form the strip-shaped pixel electrode 2 to extend in a direction in parallel with the extending direction of scanning lines 6, as described in EXAMPLE 3. Alternatively, as described in EXAMPLE 4, the present example can also be applied to a case where molecular orientation 7 of liquid crystal and the lateral electric field 8 are parallel with each other (a case of FIG. 11 or FIG. 12).

Thought the present invention has been described with reference to each of the above-described embodiments, the present invention is not limited to them. The structures and details of the present invention can be modified in various ways that can be understood by one skilled in the art. As described above, the present invention is advantageous when the pixel size is small (in particular, when the pixel size, which is length of the long side of the pixel, is 100 μm or less). However, the present invention is not necessarily limited to this. Of course, this technique can be used as a measure against finger pressing marks even if the pixel size is comparatively large. In addition, embodiments obtained by combining a part or the entire structure of one of the above-described embodiments and examples and that of another of the above-described embodiments and examples as appropriate fall within the scope of the present invention.

The present invention is applicable to lateral-electric-field mode active matrix liquid crystal display devices and any apparatuses each using such a liquid crystal display device as a display device.

The invention claimed is:

1. A lateral-electric-field mode liquid crystal display device comprising:
    a pair of substrates;
    a liquid crystal layer put between the substrates;
    a plurality of scanning lines and a plurality of data lines, both extending in straight lines and crossing each other on one of the substrates;
    a plurality of pixels formed by the scanning lines and the data lines and arrayed in matrix;
    at least one strip-shaped pixel electrode arranged in each of the pixels and extending along one of the data lines or one of the scanning lines;
    a common electrode having a grid form, located in a layer closer to the liquid crystal layer than the strip-shaped pixel electrodes so as to cover the scanning lines and the data lines, and including an opening section located in each of the pixels, each of the at least one strip-shaped pixel electrode and a part of the common electrode extending in parallel with an extending direction of the at least one strip-shaped pixel electrode forming therebetween an electric field to be applied to the liquid crystal layer, the electric field being substantially in parallel with a surface direction of the substrates; and
    a first rectangular pixel electrode arranged in each of the pixels, being greater in width than the at least one strip-shaped pixel electrode, and connected with one end of each of the at least one strip-shaped pixel electrode to form a T shape, the first rectangular pixel electrode overlapping and arranged under corner parts of an area defined by a boundary between the opening section of the common electrode and the common electrode at a first rectangular pixel side, one of the at least one strip-shaped pixel electrodes being arranged within the opening section, the corner parts being closer to the first rectangular pixel electrode than other corner parts of the opening section,
    wherein the opening section is bounded by an inner perimeter of the grid form of the common electrode, and
    no common electrodes are disposed within the opening section.

2. The liquid crystal display device of claim 1, further comprising:
    a plurality of the at least one strip-shaped pixel electrodes arranged in each of the pixels, the first rectangular pixel electrodes connected with the respective strip-shaped pixel electrodes being connected together; and
    a strip-shaped common electrode arranged between the neighboring strip-shaped pixel electrodes in each of the pixels, opposing ends of the strip-shaped common electrode being connected with the common electrode having the grid form.

3. The liquid crystal display device of claim 2, wherein an initial orientation of liquid crystal molecules in the liquid crystal layer is substantially identical with an extending direction of the scanning lines, and
    the common electrode includes an area overlapping with one of the data lines and being hollowed out in each of the pixels.

4. The liquid crystal display device of claim 1, further comprising a second rectangular pixel electrode arranged in each of the pixels, being greater in width than the at least one strip-shaped pixel electrode, and connected with the other end of each of the at least one strip-shaped pixel electrode to form a T shape.

5. The liquid crystal display device of claim 4, wherein the second rectangular pixel electrode overlaps with the one of the protruding parts while extending outside the one of the protruding part in each of the pixels.

6. The liquid crystal display device of claim 5, wherein an initial orientation of liquid crystal molecules in the liquid crystal layer is substantially identical with an extending direction of the at least one strip-shaped pixel electrode, and
    the liquid crystal molecules have positive dielectric anisotropy.

7. The liquid crystal display device of claim 5, wherein an initial orientation of liquid crystal molecules in the liquid crystal layer is substantially identical with a direction perpendicular to an extending direction of the at least one strip-shaped pixel electrode, and
    the liquid crystal molecules have negative dielectric anisotropy.

8. The liquid crystal display device of claim 1, wherein an initial orientation of liquid crystal molecules in the liquid crystal layer is substantially identical with an extending direction of the at least one strip-shaped pixel electrode, and
    the liquid crystal molecules have positive dielectric anisotropy.

9. The liquid crystal display device of claim 1, wherein an initial orientation of liquid crystal molecules in the liquid crystal layer is substantially identical with a direction perpendicular to an extending direction of the at least one strip-shaped pixel electrode, and
    the liquid crystal molecules have negative dielectric anisotropy.

10. The liquid crystal display device of claim 1, wherein the at least one strip-shaped pixel electrodes, the first rectangular pixel electrode and the common electrode are transparent.

11. The liquid crystal display device of claim 1, wherein the common electrode is transparent, and
    the at least one strip-shaped pixel electrodes and the first rectangular pixel electrode are formed out of a same material and located in a same layer as the data lines.

12. The liquid crystal display device of claim 1, wherein each of the pixels has longitudinal sides each being 100 μm or less.

* * * * *